United States Patent
Ingrassia, Jr. et al.

(10) Patent No.: US 9,633,186 B2
(45) Date of Patent: Apr. 25, 2017

(54) SYSTEMS AND METHODS FOR CONTROLLING OUTPUT OF CONTENT BASED ON HUMAN RECOGNITION DATA DETECTION

(75) Inventors: Michael I. Ingrassia, Jr., San Jose, CA (US); Nathaniel Paine Hramits, San Jose, CA (US)

(73) Assignee: APPLE INC., Cupertino, CA (US)

( * ) Notice: Subject to any disclaimer, the term of this patent is extended or adjusted under 35 U.S.C. 154(b) by 580 days.

(21) Appl. No.: 13/453,693

(22) Filed: Apr. 23, 2012

(65) Prior Publication Data
US 2013/0279744 A1     Oct. 24, 2013

(51) Int. Cl.
G06K 9/00    (2006.01)
G06F 21/32    (2013.01)
G06F 21/62    (2013.01)

(52) U.S. Cl.
CPC .......... *G06F 21/32* (2013.01); *G06F 21/6209* (2013.01); *G06F 2221/2149* (2013.01)

(58) Field of Classification Search
None
See application file for complete search history.

(56) References Cited

U.S. PATENT DOCUMENTS

| 6,049,674 | A | 4/2000 | Yamamoto et al. |
| 6,119,096 | A * | 9/2000 | Mann .................. E05G 5/003 235/384 |
| 6,374,145 | B1 | 4/2002 | Lignoul |
| 6,512,838 | B1 * | 1/2003 | Rafii .................. G01C 3/08 348/E3.018 |
| 7,138,905 | B2 | 11/2006 | Pavlidis et al. |
| 7,200,249 | B2 | 4/2007 | Okubo et al. |
| 7,305,108 | B2 * | 12/2007 | Waehner ............. G06K 9/2036 340/5.53 |

(Continued)

FOREIGN PATENT DOCUMENTS

JP    2011170548 A    *    9/2011
JP    2013051680 A    *    3/2013

(Continued)

OTHER PUBLICATIONS

Dikkers et al. "Facial Recognition System for Driver Vigilance Monitoring." Blinking and Sleeping Eyelid Detection, IEEE, 2004, pp. 3787-3792.

*Primary Examiner* — Iman K Kholdebarin
(74) *Attorney, Agent, or Firm* — Van Court & Aldridge LLP

(57) ABSTRACT

Systems and methods for controlling output of content based on human recognition data captured by one or more sensors of an electronic device are provided. The control of the output of particular content may be based on an action of a rule defined for the particular content, and may be performed when at least one human feature detection related condition of the rule is satisfied. In some embodiments, the action may include granting access to requested content when detected human feature data satisfies at least one human feature detection related condition of a rule defined for the requested content. In other embodiments the action may include altering a presentation of content, during the presentation of the content, when detected human feature data satisfies at least one human feature detection related condition of a rule defined for the presented content.

18 Claims, 6 Drawing Sheets

(56) References Cited

U.S. PATENT DOCUMENTS

| | | | |
|---|---|---|---|
| 7,370,208 B2 | 5/2008 | Levin et al. | |
| 7,380,279 B2* | 5/2008 | Prokupets | G06F 21/32 340/5.7 |
| 7,505,621 B1 | 3/2009 | Agrawal et al. | |
| 7,620,976 B2* | 11/2009 | Low | G06F 21/6245 380/1 |
| 7,636,456 B2* | 12/2009 | Collins | G09F 27/00 382/118 |
| 7,643,658 B2* | 1/2010 | Kilner | G06K 9/00221 382/103 |
| 7,987,111 B1* | 7/2011 | Sharma | G06Q 30/02 705/7.29 |
| 8,274,482 B2* | 9/2012 | Kim | G06F 3/0488 178/18.01 |
| 8,339,455 B2* | 12/2012 | Baba | G07C 9/00111 340/5.7 |
| 8,370,639 B2* | 2/2013 | Azar et al. | 713/186 |
| 8,656,437 B2* | 2/2014 | Paxton | H04N 7/17336 725/145 |
| 8,787,984 B2* | 7/2014 | Murakami | G06F 3/0488 455/411 |
| 8,811,746 B2* | 8/2014 | Sawada | G01C 3/08 382/191 |
| 2002/0041327 A1* | 4/2002 | Hildreth | G06F 3/011 348/42 |
| 2002/0145507 A1* | 10/2002 | Foster | G07C 9/00563 340/5.53 |
| 2003/0046703 A1* | 3/2003 | Knowles | G06F 17/30017 725/92 |
| 2003/0103652 A1 | 6/2003 | Lee et al. | |
| 2004/0040034 A1* | 2/2004 | Sullivan | H04N 5/4401 725/25 |
| 2004/0257196 A1 | 12/2004 | Kotzin | |
| 2005/0044143 A1 | 2/2005 | Zimmermann et al. | |
| 2005/0175218 A1* | 8/2005 | Vertegaal | A61B 3/113 382/103 |
| 2005/0193144 A1* | 9/2005 | Hassan | G06F 21/31 709/238 |
| 2005/0198661 A1* | 9/2005 | Collins | G09F 27/00 725/19 |
| 2005/0226472 A1* | 10/2005 | Komura | B60R 25/25 382/118 |
| 2006/0082439 A1* | 4/2006 | Bazakos | G06K 9/00228 340/5.82 |
| 2006/0102843 A1* | 5/2006 | Bazakos | G06K 9/00255 250/339.05 |
| 2006/0114320 A1* | 6/2006 | Nagaoka | G06T 7/002 348/118 |
| 2006/0184800 A1 | 8/2006 | Rosenberg | |
| 2006/0192775 A1 | 8/2006 | Nicholson et al. | |
| 2006/0244829 A1* | 11/2006 | Kato | B60R 1/00 348/148 |
| 2006/0288234 A1* | 12/2006 | Azar | G06F 21/32 713/186 |
| 2007/0003112 A1* | 1/2007 | Awatsu | G06K 9/00 382/115 |
| 2007/0083915 A1* | 4/2007 | Janakiraman | G06F 21/316 726/4 |
| 2007/0118848 A1* | 5/2007 | Schwesinger | H04H 60/33 725/9 |
| 2007/0192910 A1* | 8/2007 | Vu | B25J 5/007 700/245 |
| 2007/0236475 A1* | 10/2007 | Wherry | G06F 3/0485 345/173 |
| 2008/0159591 A1* | 7/2008 | Ruedin | G06K 9/6289 382/103 |
| 2008/0218493 A1* | 9/2008 | Patten | G09G 5/10 345/173 |
| 2008/0247611 A1 | 10/2008 | Aisaka et al. | |
| 2008/0297586 A1* | 12/2008 | Kurtz | H04N 7/147 348/14.08 |
| 2009/0126010 A1 | 5/2009 | Chakra et al. | |
| 2009/0138805 A1* | 5/2009 | Hildreth | G06K 9/00335 715/745 |
| 2009/0146779 A1* | 6/2009 | Kumar | G06K 9/00885 340/5.31 |
| 2009/0160609 A1* | 6/2009 | Lin | G06F 21/32 340/5.83 |
| 2009/0235151 A1* | 9/2009 | Bates | G06F 17/30855 715/205 |
| 2009/0256814 A1* | 10/2009 | Chung | G06F 1/3215 345/173 |
| 2009/0295832 A1 | 12/2009 | Takatsuka et al. | |
| 2010/0045788 A1* | 2/2010 | Zhang | G06K 9/00067 348/77 |
| 2010/0125816 A1 | 5/2010 | Bezos | |
| 2010/0141381 A1* | 6/2010 | Bliding | G07C 9/00309 340/5.61 |
| 2010/0157062 A1* | 6/2010 | Baba | G07C 9/00111 348/156 |
| 2010/0162285 A1 | 6/2010 | Cohen et al. | |
| 2010/0164959 A1* | 7/2010 | Brown | G06F 3/04886 345/473 |
| 2010/0205667 A1 | 8/2010 | Anderson et al. | |
| 2010/0238262 A1 | 9/2010 | Kurtz et al. | |
| 2010/0259561 A1* | 10/2010 | Forutanpour | G06F 3/0216 345/660 |
| 2010/0295839 A1* | 11/2010 | Nagaya | G06F 1/3265 345/212 |
| 2010/0295988 A1 | 11/2010 | Shimoda | |
| 2010/0322485 A1* | 12/2010 | Riddiford | G06F 3/04842 382/115 |
| 2011/0001604 A1* | 1/2011 | Ludlow | G07C 9/00031 340/5.6 |
| 2011/0065479 A1 | 3/2011 | Nader | |
| 2011/0067098 A1* | 3/2011 | Nelson | G06F 21/32 726/21 |
| 2011/0107374 A1* | 5/2011 | Roberts | H04N 5/44543 725/46 |
| 2011/0119697 A1* | 5/2011 | Emerson | H04N 7/17318 725/25 |
| 2011/0134273 A1 | 6/2011 | Mise et al. | |
| 2011/0135114 A1 | 6/2011 | Oba et al. | |
| 2011/0141114 A1* | 6/2011 | Chen | G06F 3/012 345/428 |
| 2011/0199482 A1* | 8/2011 | Morgan | H04N 5/2251 348/143 |
| 2011/0211738 A1* | 9/2011 | Eckhoff | G06Q 30/02 382/118 |
| 2011/0285657 A1* | 11/2011 | Shimotani | G06F 3/0416 345/173 |
| 2011/0292181 A1* | 12/2011 | Acharya | G06F 3/011 348/47 |
| 2011/0304833 A1* | 12/2011 | Osaka | G03B 21/00 353/85 |
| 2011/0316805 A1* | 12/2011 | Yamada | G06F 3/038 345/173 |
| 2012/0174143 A1* | 7/2012 | Yang | H04N 21/4223 725/10 |
| 2012/0189162 A1* | 7/2012 | Sawada | G01C 3/08 382/103 |
| 2012/0314083 A1* | 12/2012 | Ratliff | H04N 5/2251 348/164 |
| 2013/0035141 A1* | 2/2013 | Murakami | G06F 3/0488 455/566 |
| 2013/0063380 A1* | 3/2013 | Wang | G06F 3/04883 345/173 |
| 2013/0117705 A1* | 5/2013 | Ting | H04M 1/67 715/781 |
| 2013/0236071 A1* | 9/2013 | Ishikawa | G06Q 30/0201 382/118 |
| 2014/0078176 A1* | 3/2014 | Kim | G06F 3/017 345/633 |
| 2014/0085451 A1* | 3/2014 | Kamimura | H04N 5/23219 348/78 |
| 2014/0135070 A1* | 5/2014 | Shi | G06F 1/3231 455/566 |

(56) References Cited

U.S. PATENT DOCUMENTS

| | | | | |
|---|---|---|---|---|
| 2014/0169641 A1* | 6/2014 | Lee | G06K 9/00268 382/116 |
| 2014/0233796 A1* | 8/2014 | Tanaka | G06T 7/2033 382/103 |
| 2014/0240260 A1* | 8/2014 | Park | G06F 3/0488 345/173 |
| 2014/0285418 A1* | 9/2014 | Adachi | G06F 3/013 345/156 |
| 2014/0365904 A1* | 12/2014 | Kim | G06F 3/0484 715/741 |
| 2015/0067571 A1* | 3/2015 | Marsden | G06F 17/276 715/773 |
| 2015/0082216 A1* | 3/2015 | Dai | G06F 3/04886 715/767 |
| 2015/0178554 A1* | 6/2015 | Kanaujia | G06T 19/20 382/118 |
| 2015/0187828 A1* | 7/2015 | Salsman | B81B 3/0029 348/164 |
| 2015/0235070 A1* | 8/2015 | Wang | G06K 9/00006 382/115 |
| 2015/0235098 A1* | 8/2015 | Lee | G06K 9/00912 715/709 |
| 2015/0309568 A1* | 10/2015 | Miki | G06F 3/013 345/173 |
| 2015/0324116 A1* | 11/2015 | Marsden | H03K 17/9622 345/158 |

FOREIGN PATENT DOCUMENTS

| | | |
|---|---|---|
| WO | 2008/130907 | 10/2008 |
| WO | 2010/073045 | 7/2010 |

\* cited by examiner

| RULE | | CONTENT | | CONDITION | | ACTION | | PRIORITY |
|---|---|---|---|---|---|---|---|---|
| 320 | 321 | particular adult-rated material (OR any material that may be adult-rated) | 322a | currently being presented, and at least one child is detected | 322b | alter the presentation | | 1 |
| | | | 324a | access is being requested, at least one adult is detected, and no children are detected | 324b | grant access | | 1 |
| 330 | 331 | particular application (OR any application of a particular type) | 332a | currently being presented, and a required individual is not detected | 332b | alter the presentation | | 1 |
| | | | 334a | access is being requested, and no unauthorized individuals are detected | 334b | grant access | | 1 |
| 340 | 341 | particular sensitive data (OR any data that may be sensitive) | 342a | currently being presented, and an unauthorized individual is detected | 342b | alter the presentation | | 1 |
| | | | 344a | access is being requested, and only a specific individual is detected | 344b | grant access | | 1 |
| 350 | 351 | particular sensitive data (OR any data that may be sensitive) | 352a | currently being presented, an unauthorized individual is detected, and current location is "X" | 352b | continue presentation | | 1 |
| | | | 354a | currently being presented, an unauthorized individual is detected, and current location is not "X" | 354b | alter the presentation | | 1 |
| 360 | 361 | particular multi-media (OR any type of multi-media) | 362a | currently being presented, and at least one elderly individual is detected | 362b | alter the presentation | | 2 |
| | | | 364a | currently being presented, at least one elderly individual is detected, and one of the at least one elderly individual is individual "A" | 364b | alter the presentation | | 2 |
| | | | 366a | an individual associated with a particular language is detected | 366b | alter the presentation | | 3 |
| | | | 368a | access is being requested, individual "A" is detected, and playback of the multi-media was most recently paused or stopped by individual "A" | 368b | grant access | | 1 |
| | | | 369a | access is being requested, individual "A" is detected, and individual "B" is detected | 369b | grant access | | 1 |
| 370 | 371 | content that may use an on-screen keyboard | 372a | currently being presented, and at least one individual is detected beyond a threshold distance | 372b | display the on-screen keyboard | | 3 |

FIG. 3

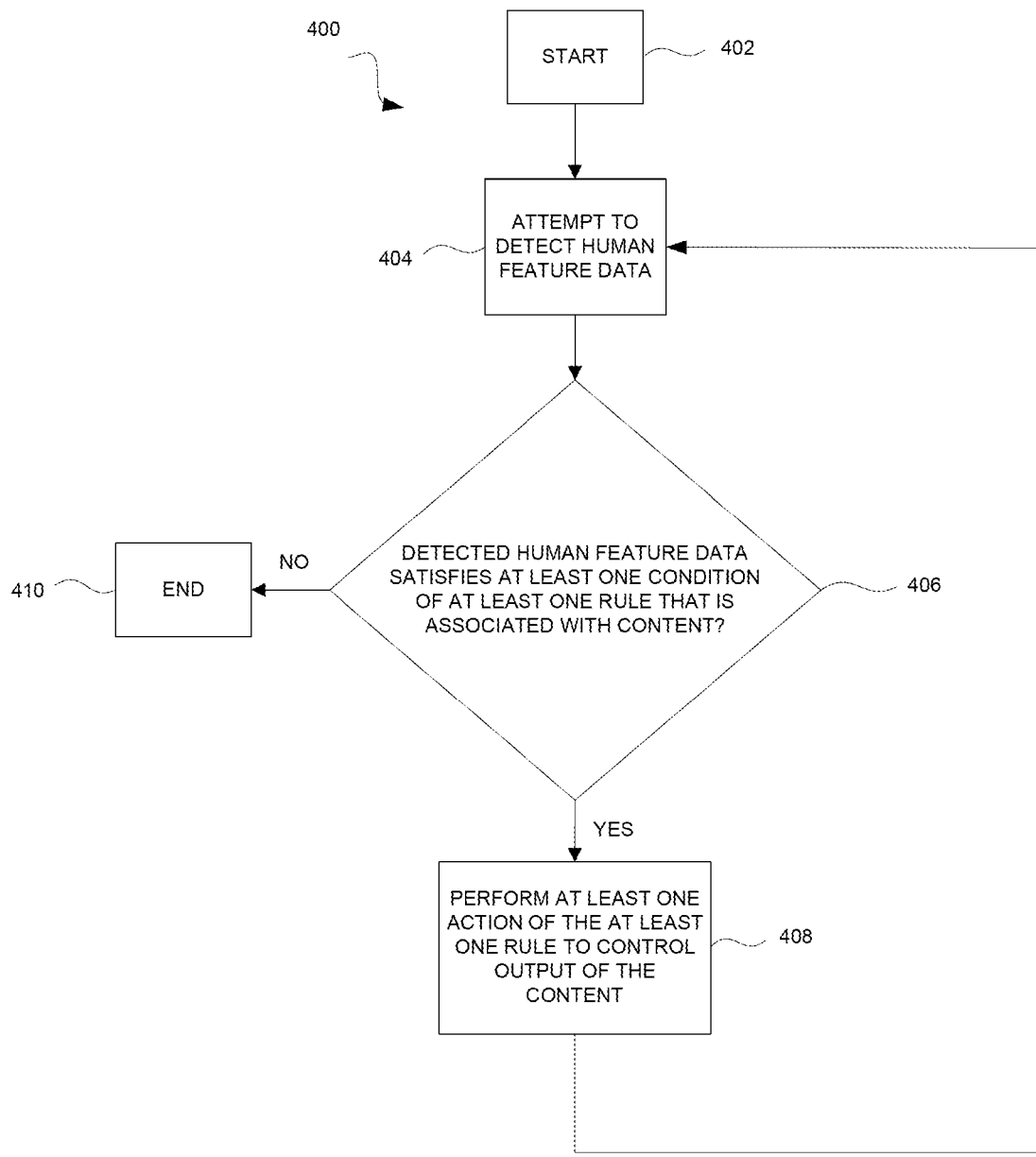

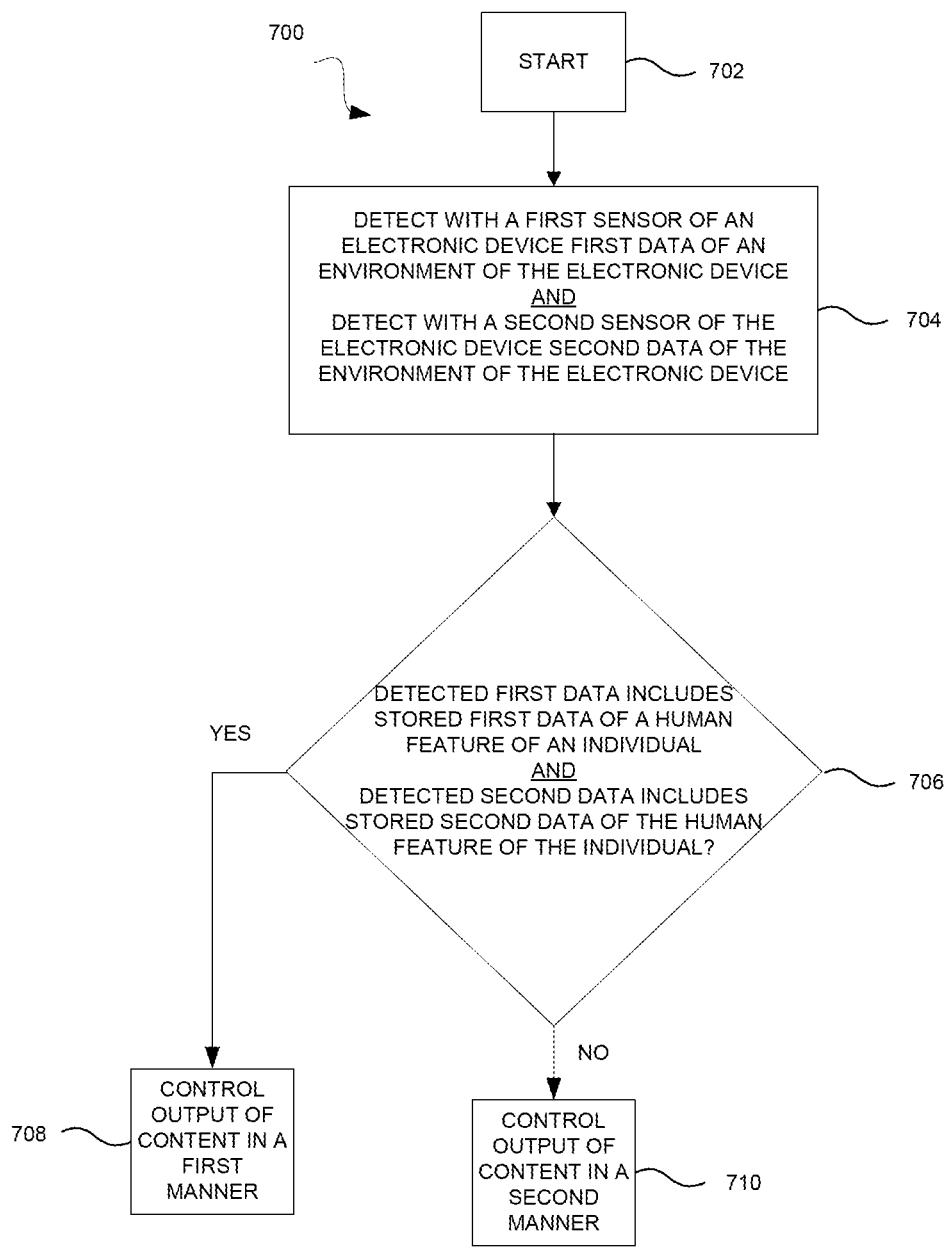

SYSTEMS AND METHODS FOR CONTROLLING OUTPUT OF CONTENT BASED ON HUMAN RECOGNITION DATA DETECTION

FIELD OF THE INVENTION

This can relate to systems and methods for controlling output of content using an electronic device and, more particularly, to systems and methods for controlling output of content based on human recognition data captured by one or more sensors of an electronic device.

BACKGROUND OF THE DISCLOSURE

Many electronic devices provide the ability to sense or detect information from its surroundings when instructed by a user. In particular, many computers, laptops, tablets, cellular telephones, personal digital assistants, and other electronic devices include one or more cameras that can capture still or moving images and/or one or more infrared detectors that can detect heat data. Many of these devices also provide a user with the ability to access content using the device and to alter settings relating to the presentation of the content according to the user's desire. For example, a user may "login" to an electronic device, access private emails, play an adult-rated movie, halt playing of the movie when a child walks in the room, and perform many other actions using the device depending on the circumstances. However, one or more manual actions must be performed by the user in order to accomplish each of these tasks and, oftentimes, the user may not even be aware that one or more of these actions should be performed (e.g., that playback of an adult-rated movie should be stopped because a child has stepped into the room).

SUMMARY OF THE DISCLOSURE

Systems and methods for controlling output of content based on human recognition data captured by one or more sensors of an electronic device are provided.

In some embodiments, a method of controlling output of content using an electronic device may be provided. The content may be associated with at least one rule that includes at least one condition and at least one action. The method may include attempting with the electronic device to detect human feature data, in response to detecting the human feature data, determining with the electronic device whether the detected human feature data satisfies the at least one condition of the at least one rule, and, in response to a determination that the detected human feature data satisfies the at least one condition, performing with the electronic device the at least one action to control the output of the content.

In some embodiments, an electronic device for controlling output of content may be provided. The content may be associated with at least one rule that includes at least one condition and at least one action. The electronic device may include a detector configured to detect human feature data and a processor. The process may be configured to direct the detector to attempt to detect the human feature data, receive the detect human feature data from the detector, and determine whether the detected human feature data satisfies the at least one condition of the at least one rule. The process may also be configured to, in response to a determination that the detected human feature data satisfies the at least one condition, perform the at least one action to control the output of the content.

In some embodiments, a method may be provided and may include receiving with an electronic device a first user input to define a rule for particular content to control output of the particular content, receiving with the electronic device a second user input to associate at least one action of the electronic device and at least one condition with the defined rule, and associating with the electronic device the at least one action and the at least one condition with the defined rule. The at least one condition may be related to human feature detection.

In some embodiments, a method may be provided and may include determining with an electronic device when a user is interacting with the electronic device, in response to a determination that the user is interacting with the electronic device, attempting to detect human feature data in a first fashion, and in response to a determination that the user is not interacting with the electronic device, attempting to detect human feature data in a second fashion.

In some embodiments, a method of controlling output of content using an electronic device may be provided. The method may include detecting with a first sensor of the electronic device first data of an environment of the electronic device, detecting with a second sensor of the electronic device second data of the environment of the electronic device, and determining with the electronic device whether the detected first data comprises stored first data of a human feature of an individual and whether the detected second data comprises stored second data of the human feature of the individual. The method may also include, in response to a determination that the detected first data includes the stored first data and that the detected second data includes the stored second data, controlling with the electronic device the output of the content in a first manner. The method may also include, in response to a determination that at least one of the detected first data does not include the stored first data and the detected second data does not include the stored second data, controlling the output of the content in a second manner.

In some embodiments, there may be provided non-transitory computer-readable media for controlling output of content on an electronic device. The content may be associated with at least one rule that may include at least one condition and at least one action. The non-transitory computer-readable media may include computer-readable code recorded thereon for attempting to detect human feature data, in response to detecting the human feature data, determining whether the detected human feature data satisfies the at least one condition of the at least one rule, and, in response to a determination that the detected human feature data satisfies the at least one condition, performing the at least one action to control the output of the content.

In some embodiments, there may be provided non-transitory computer-readable media for controlling an electronic device that may include computer-readable code recorded thereon for receiving a first user input to define a rule for particular content to control output of the particular content, receiving a second user input to associate at least one action and at least one condition with the defined rule, and associating the at least one action and the at least one condition with the defined rule. The at least one condition may be related to human feature detection.

In some embodiments, there may be provided non-transitory computer-readable media for controlling an electronic device that may include computer-readable code recorded thereon for determining when a user is interacting with the electronic device, in response to a determination that the user is interacting with the electronic device, attempting to detect human feature data in a first fashion, and, in response to a determination that the user is not interacting with the electronic device, attempting to detect human feature data in a second fashion.

In some embodiments, there may be provided non-transitory computer-readable media for controlling output of content on an electronic device that may include computer-readable code recorded thereon for detecting with a first sensor of the electronic device first data of an environment of the electronic device, detecting with a second sensor of the electronic device second data of the environment of the electronic device, determining whether the detected first data includes stored first data of a human feature of an individual and whether the detected second data includes stored second data of the human feature of the individual, in response to a determination that the detected first data includes the stored first data and that the detected second data includes the stored second data, controlling the output of the content in a first manner, and, in response to a determination that at least one of the detected first data does not include the stored first data and the detected second data does not include the stored second data, controlling the output of the content in a second manner.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which:

FIG. 3 shows an illustrative data structure that may store rules for controlling output of content, in accordance with some embodiments of the invention;

FIG. 4 is a flowchart of an illustrative process for controlling output of content, in accordance with some embodiments of the invention;

FIG. 7 is a flowchart of an illustrative process for performing human feature recognition for controlling output of content, in accordance with some embodiments of the invention.

DETAILED DESCRIPTION OF THE DISCLOSURE

Figure 1:
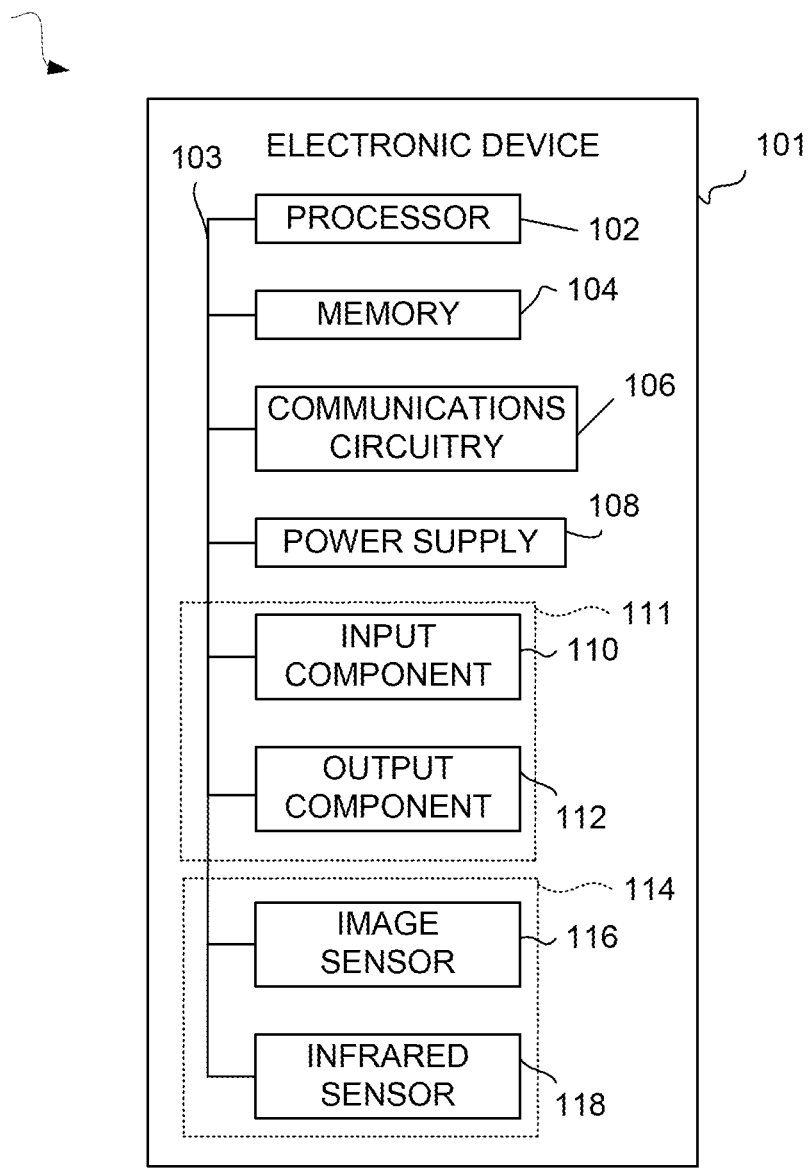
FIG. 1 is a schematic view of an illustrative electronic device for controlling output of content, in accordance with some embodiments of the invention.

Systems and methods for controlling output of content based on human recognition data captured by one or more sensors of an electronic device are provided and described with reference to FIGS. 1-7.

An electronic device may be operative to capture human recognition data of one or more individuals by employing one or more sensors. For example, an electronic device may include a camera with an optical or digital lens operative to capture light reflected by one or more individuals in the line of sight of the camera and by the individuals' surrounding environment in the line of sight of the camera. The electronic device may be operative to store particular images captured by the lens for analysis (e.g., to detect one or more faces of one or more individuals). Alternatively or additionally, the electronic device may include an infrared sensor to capture heat data reflected off of the one or more individuals' faces. As yet another example, a microphone may capture audio data that may be analyzed to detect a voice of one or more particular individuals. The electronic device may capture human recognition data at any suitable time, including, for example, when there is no input being received by a user input component of the device (e.g., when a keyboard or mouse has not been utilized for a certain period of time), after a delay (e.g., when a timer has been activated), or automatically (e.g., at a particular moment in time or when the electronic device detects a particular event). The electronic device may also analyze the captured human recognition data at any suitable time, including, for example, immediately in response to a specific change in captured data.

Based upon the analysis of captured human recognition data, the electronic device may determine a profile of one or more detected individuals from the captured human recognition data (e.g., three faces being detected, such as one belonging to a child, one belonging to an adult female, and one belonging to an elderly male). In addition, the electronic device may also determine whether one or more conditions of a rule that may be defined for particular content is satisfied. In particular, the electronic device may be configured to determine whether one or more conditions of a rule that may be defined for particular content is satisfied based on the determined profile of the one or more detected individuals (e.g., whether a child is detected). In some embodiments, access to particular content may be requested, and the electronic device may grant access to the requested content only if one or more conditions of a rule defined for the content is satisfied (e.g., only if the profile of detected individuals includes a required user and no one else other than the required user (e.g., access to a sensitive e-mail may only be granted if a specific individual is detected and no other individual is detected)). In other embodiments, particular content may be presented (e.g., an adult movie may be played) while a rule defined for the content is checked. If a condition of the rule is satisfied, for example, the electronic device may alter a presentation of the content by performing an action of the rule (e.g., the electronic device may instruct a media player application to stop the playback of the adult movie when the profile of detected individuals includes at least one child). The output of various types of content may be controlled by such rules, including, for example, e-mails, documents, files, applications, movies, songs, audio clips, video clips, TV programs, any combination thereof, and any other type of content.

FIG. 1 is a schematic view of an illustrative electronic device 100 that may control output of content. In some embodiments, electronic device 100 may perform a single function (e.g., a device dedicated to storing image content) and, in other embodiments, electronic device 100 may perform multiple functions (e.g., a device that stores image content, plays music, and receives and transmits telephone calls). Moreover, in some embodiments, electronic device 100 may be any portable, mobile, or hand-held electronic device configured to control output of content. Alternatively, electronic device 100 may not be portable at all, but may instead be generally stationary. Electronic device 100 may include any suitable type of electronic device operative to control output of content. For example, electronic device 100 may include a media player (e.g., an iPod™ available by Apple Inc. of Cupertino, Calif.), a cellular telephone (e.g., an iPhone™ available by Apple Inc.), a personal e-mail or messaging device (e.g., a Blackberry™ available by Research In Motion Limited of Waterloo, Ontario), any other wireless communication device, a pocket-sized personal computer, a personal digital assistant ("PDA"), a tablet, a laptop computer, a desktop computer, a music recorder, a still camera, a movie or video camera or recorder, a radio, medical equipment, any other suitable type of electronic device, and any combinations thereof.

Electronic device 100 may include a processor or control circuitry 102, memory 104, communications circuitry 106, power supply 108, input component 110, output component 112, and a detector 114. Electronic device 100 may also include a bus 103 that may provide a transfer path for transferring data and/or power, to, from, or between various other components of device 100. In some embodiments, one or more components of electronic device 100 may be combined or omitted. Moreover, electronic device 100 may include other components not combined or included in FIG. 1. For example, electronic device 100 may include motion detection circuitry, light sensing circuitry, positioning circuitry, or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music, image, and video files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 may be provided to allow device 100 to communicate with one or more other electronic devices or servers using any suitable communications protocol. For example, communications circuitry 106 may support Wi-Fi (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 106 may also include circuitry that can enable device 100 to be electrically coupled to another device (e.g., a computer or an accessory device) and communicate with that other device, either wirelessly or via a wired connection.

Power supply 108 may provide power to one or more of the other components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100. For example, input component 110 can take a variety of forms, including, but not limited to, an electronic device pad, dial, click wheel, scroll wheel, touch screen, one or more buttons (e.g., a keyboard), mouse, joy stick, track ball, and combinations thereof. For example, input component 110 may include a multi-touch screen. Each input component 110 can be configured to provide one or more dedicated control functions for making selections or issuing commands associated with operating device 100.

Electronic device 100 may also include one or more output components 112 that may present information (e.g., textual, graphical, audible, and/or tactile information) to a user of device 100. Output component 112 of electronic device 100 may take various forms, including, but not limited, to audio speakers, headphones, audio line-outs, visual displays, antennas, infrared ports, rumblers, vibrators, or combinations thereof.

For example, output component 112 of electronic device 100 may include an image display 112 as an output component. Such an output component display 112 may include any suitable type of display or interface for viewing image data captured by detector 114. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 112 can include a movable display or a projecting system for providing a display of content on a surface remote from electronic device 100, such as, for example, a video projector, a head-up display, or a three-dimensional (e.g., holographic) display.

It should be noted that one or more input components 110 and one or more output components 112 may sometimes be referred to collectively herein as an I/O interface (e.g., input component 110 and output component 112 as I/O interface 111). It should also be noted that input component 110 and output component 112 may sometimes be a single I/O component, such as a touch screen that may receive input information through a user's touch of a display screen and that may also provide visual information to a user via that same display screen.

Detector 114 may include one or more sensors of any suitable type that may capture human recognition data (e.g., face data) that may be utilized to detect the presence of one or more individuals. For example, detector 114 may include an image sensor 116 and/or an infrared sensor 118. Image sensor 116 may include one or more cameras with any suitable lens or number of lenses that may be operative to capture images of the surrounding environment of electronic device 100. For example, image sensor 116 may include any number of optical or digital lenses for capturing light reflected by the device's environment as an image. The captured light may be stored as an individual distinct image or as consecutive video frame images of a recording (e.g., several video frames including a primary frame and one or more subsequent frames that may indicate the difference between the primary frame and the subsequent frame). As used herein, the term "camera lens" may be understood to mean a lens for capturing light or a lens and appropriate circuitry for capturing and converting captured light into an image that can be analyzed or stored by electronic device 100 as either an individual distinct image or as one of many consecutive video frame images.

Infrared ("IR") sensor 118 may include any suitable type of sensor capable of detecting signals in infrared wavelengths (e.g., near-infrared). Infrared sensor 118 may be capable of distinguishing an object from its environment by detecting differences in their respective heat signatures. Infrared sensor 118 may also be capable of detecting finer details of an object (e.g., facial features) using any suitable technique.

In some embodiments, detector 114 may also include one or more sensors that may detect any human feature or characteristic (e.g., physiological, psychological, physical, movement, etc.). For example, detector 114 may include a microphone for detecting voice signals from one or more individuals. As another example, detector 114 may include a heartbeat sensor for detecting heartbeats of one or more individuals. As yet other examples, detector 114 may include a fingerprint reader, an iris scanner, a retina scanner, a breath sampler, and a humidity sensor that may detect moisture and/or sweat emanating from any suitable portion of an individual's body. For example, detector 114 may include a humidity sensor that may be situated near or coupled to one or more portions of input component 110, and that may detect moisture and/or sweat from an individual's hands. It should be appreciated that any detector 114 may include any sensor that may detect any human feature or characteristic.

In some embodiments, detector 114 may also include positioning circuitry for determining a current position of device 100. The positioning circuitry may be operative to update the current position at any suitable rate, including at relatively high rates to provide an estimation of speed and distance traveled. In some embodiments, the positioning circuitry may include a global positioning system ("GPS") receiver for accessing a GPS application function call that may return geographic coordinates (i.e., a geographic location) of the device. The geographic coordinates may be fundamentally, alternatively, or additionally, derived from any suitable trilateration or triangulation technique. For example, the positioning circuitry may determine the current location of device 100 by using various measurements (e.g., signal-to-noise ratio ("SNR") or signal strength) of a network signal (e.g., a cellular telephone network signal) that may be associated with device 100. For example, a radio frequency ("RF") triangulation detector or sensor integrated with or connected to device 100 may determine the (e.g., approximate) current location of device 100. Device 100's current location may be determined based on various measurements of device 100's own network signal, such as, for example: (1) an angle of the signal's approach to or from one or more cellular towers, (2) an amount of time for the signal to reach one or more cellular towers or device 100, (3) the strength of the signal when it reaches one or more towers or device 100, or any combination of the aforementioned measurements. Other forms of wireless-assisted GPS (e.g., enhanced GPS or A-GPS) may also be used to determine the current position of device 100. Instead or in addition, the positioning circuitry may determine the current location of device 100 based on a wireless network or access point that may be in range or a wireless network or access point to which device 100 may be currently connected. For example, because wireless networks may have a finite range, a wireless network that may be in range of device 100 may indicate that device 100 is located in within a detectable vicinity of the wireless network. In some embodiments, device 100 may automatically connect to a wireless network that may be in range in order to receive valid modes of operation that may be associated or that may be available at the current position of device 100.

In some embodiments, detector 114 may also include motion sensing circuitry for detecting motion of an environment of device 100 and/or objects in the environment. For example, the motion sensing circuitry may detect a movement of an object (e.g., an individual) about device 100 and may generate one or more signals based on the detection.

Processor 102 of device 100 may control the operation of many functions and other circuitry provided by device 100. For example, processor 102 may receive input signals from input component 110 and/or drive output signals through display 112. Processor 102 may load a manager program (e.g., a program stored in memory 104 or another device or server accessible by device 100) to process or analyze data received via detector 114 or inputs received via input component 110 to control output of content that may be provided to the user via output component 112 (e.g., display 112). Processor 102 may associate different metadata with the human recognition data captured by detector 114, including, for example, positioning information, device movement information, a time code, a device identifier, or any other suitable metadata. Electronic device 100 (e.g., processor 102, any circuitry of detector 114, or any other component available to device 100) may be configured to capture data with detector 114 at various resolutions, frequencies, intensities, and various other characteristics as may be appropriate for the capabilities and resources of device 100.

Electronic device 100 may also be provided with a housing 101 that may at least partially enclose one or more of the components of device 100 for protecting them from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 2:
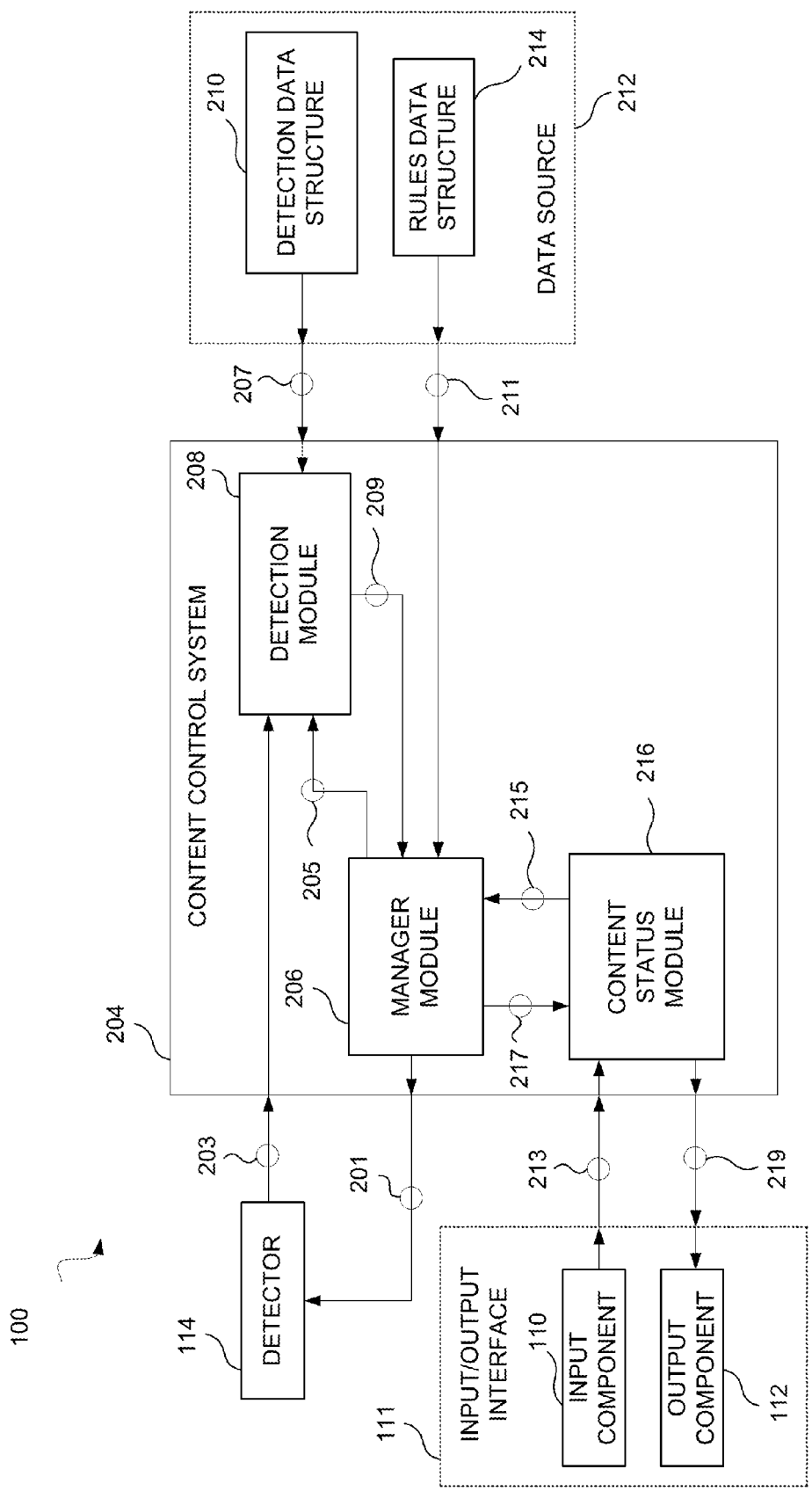
FIG. 2 is a schematic view of an illustrative portion of the electronic device of FIG. 1, in accordance with some embodiments of the invention.

FIG. 2 is a schematic view of a content control system 204 of electronic device 100 that may be provided to control output of content based on human recognition data. In some embodiments, content control system 204 may be implemented using processor 102 of device 100. Content control system 204 may include manager module 206 that may manage the control of output of content, detection module 208 that may analyze human recognition data captured by detector 114 for determining a profile of one or more detected individuals, and content status module 216 that may present content on output component 112, monitor a status of content being presented, and interface with I/O interface 111 to receive user inputs from input component 110.

Content control system 204 may interface with data source 212 that may include any data source that may be accessible to device 100 (e.g., local memory 104 or a remote data source that may be accessible via communications circuitry 106). Data source 212 may include detection data structure 210 that may store data associated with human detection and/or recognition, and rules data structure 214 that may store one or more rules that may be associated with or defined for particular content. In some embodiments, detection module 208 may also perform human detection training for training detection module 208 to detect and recognize particular individuals. As a result of the training, an individual may have human recognition data captured by detector 114 (e.g., image sensor 116 and/or infrared sensor 118) during training that may be associated with a corresponding user account accessible by device 100 (e.g., a user account stored in detection data structure 210).

Detector control instructions 201 may include instructions that may be sent from manager module 206 to detector 114 to control the operation of detector 114 (e.g., to dictate how often detector 114 captures data, to control whether detector 114 uses image sensor 116, infrared sensor 118, and/or any other available sensor to capture data, etc.). Detector control instructions 201 may be provided by manager module 206 based on status information that may be received by manager module 206 content status module 216 (e.g., based on current content status information 215). Current content status information 215 may be indicative of the current status of content being provided by device 100 or the current status of any other portion of device 100 (e.g., battery life of device 100, power conservation rules of device 100, etc.). Captured human recognition data 203 may include data that may be captured by detector 114 and that may be sent to detection module 208 for analysis.

Human detection request 205 may include one or more requests that may be sent from manager module 206 to detection module 208 that may request that detection module 208 analyze current captured data 203 and generate current detected human profile data 209 based on the analysis. Detected human profile data 209 may be provided to manager module 206 by detection module 208 and may include data that may define one or more individuals (e.g., as one or more specific individuals and/or as one or more general classes of individuals) that may be detected in captured data 203.

Human detection request 205 may be provided by manager module 206 based on various factors, and may be defined by one or more rules that may be defined for particular content of interest. For example, if access to document X content is currently being requested, manager module 206 may first review one or more rules that may be defined for document X and may determine, based on the rule(s), that access may only be granted to document X if user Y is detected by device 100, in which case human detection request 205 may specifically request that detection module 208 only analyze current captured data 203 for detecting user Y (e.g., as opposed to analyzing current captured data 203 for all possible individuals). This may reduce the amount of processing that may be required for the detection of individuals relevant for the particular content, and thus, may conserve power of device 100.

Human detection data 207 may include information and/or techniques that may be accessible to detection module 208 from detection data structure 210 for use in analyzing current captured human recognition data 203 and generating current detected human profile data 209 based on the analysis. Human detection data 207 may include any suitable technique useful for detecting and/or recognizing one or more individuals from current captured face 203 (e.g., knowledge-based detection techniques, feature-based detection techniques, template matching techniques, appearance-based detection techniques, and any other statistical and/or predictive analysis techniques). Knowledge-based techniques may be based on rule-based and/or top-down methods that may encode prior knowledge of what is included in a typical face or any other human feature (e.g., voice). For example, these rules may include relationships between facial features and may be advantageous for face localization. Feature-based and/or feature invariant techniques may specify structural features of a face or other human feature that may exist under varying conditions, such as changes in pose, viewpoint, image quality, and/or lighting. For example, these techniques may be advantageous for face localization. Feature invariant techniques may involve, without limitation, facial feature data, facial texture data, facial skin color data, and/or a combination of color, size, and shape of a face. Template matching techniques may include methods of storing standard features of a face and using a correlation between a captured input image and the stored patterns to detect a face or faces. Template matching may include, without limitation, pre-defined templates and/or deformable templates. Appearance-based techniques may include models that may be learned from a set of training images that may capture the variability of facial features. Appearance-based techniques may involve, without limitation, eigenface data, distribution-based data, neural networks, support vector machines, naive bayes classifiers, hidden markov models, and information theoretical approaches.

Detection module 208 may utilize data that may be stored in detection data structure 210 and any other available data (e.g., data that may be stored as part of detection/recognition training described above) when analyzing current captured human recognition data 203 for determining current detected human profile data 209. For example, detection data structure 210 may have already stored human feature data for one or more individuals, and other data that may assist in determining the identity, age, race, and/or gender of any detected human feature data using any of the human feature detection and/or recognition techniques described above or any other suitable techniques. In some embodiments, detection data structure 210 may include human feature data associated with human features of a particular individual or general class of individuals to enable detection and/or recognition of that particular individual or that general class of individuals. Such data may include eye data, nose data, mouth data, chin data, face areas data, face feature distance data, face shape data, face feature angles data, any other suitable face related data, voice data, and any other suitable human feature data for a particular individual or class of individuals. Detection module 208 may, for example, compare current captured data 203 with any of the human feature data that may be stored in detection data structure 210 using any suitable human detection technique, and may determine the number of individuals detected, the identity, age, race, and/or gender of each of the detected individuals, whether any of the detected individuals are authorized individuals of particular content, and any other suitable information.

Content rule data 211 may include data that may be accessible to manager module 206 from content rule data structure 214. Content rules data 211 may include one or more rules that may be defined for particular content. A particular content or a particular content type may be associated with a particular rule in content rules data structure 214, and may include one or more conditions related to human detection. For example, a confidential file may be particular content that may be associated with a particular rule that may require, as a condition, that the face of individual X be detected prior to granting access to the confidential file. As another example, media of a particular type (e.g., videos) may be particular content that may be associated with a particular rule that may control presentation (e.g., a volume setting) of the media when an elderly individual is detected.

User interaction data 213 may include data that may be received by content status module 216 from input component 110. For example, user interaction data 213 may indicate a user's desire to access particular content, a user's interaction with already accessed content, and/or a user's interaction with device 100 in general (e.g., movement of a mouse, pause/play/volume commands for manipulating accessed content, etc.), all of which may be used to define a current status of device 100 and/or a current status of content to be manipulated based on human recognition data. Current content status information 215 may include information that may be received by manager module 206 from content status module 216 and that may alert manager module 206 of particular content that a user may be requesting access to or that a user may be currently interacting with. Manager module 206 may access one or more rules in content rule data 211 that may be defined for that particular content indicated by current content status information 215, and manager module 206 may then analyze the one or more rules in light of current detected human profile data 209. In some embodiments, current content status information 215 may include content presentation status information of device 100 (e.g., status information indicating that a media player application of device 100 may currently be playing a movie file, information indicating that a particular application that is currently running on device 100 may interface with a particular input interface application of device 100 (e.g., an on-screen keyboard), etc.). Such content presentation status information may assist manager module 206 in generating content control instruction 217.

Content control instruction 217 may include one or more instructions or commands that may be generated by manager module 206 and that may be sent to content status module 216 in response to analysis of a rule of particular content in light of current detected human profile data 209. Content control instruction 217 may be indicative of an action corresponding to a satisfied condition of the rule for that particular content and/or may be indicative of any changes and/or control that may need to be applied to that content.

Adjusted control information 219 may include information that may be sent by content status module 216 to I/O interface 111 and that may control presentation of particular content on output component 112 based on content control instruction 217. For example, adjusted control information 219 may include one or more control commands for muting an audio speaker of output component 112, increasing a display size of content being displayed on a display of output component 112, pausing media playback on output component 112, and the like.

It should be appreciated that, although FIG. 2 may show manager module 206, detection module 208, and content status module 216 as discrete modules, any of these modules may be combined in any suitable manner, and/or any of these modules may be provided by multiple modules.

FIG. 3 shows an illustrative data structure 300 that may store one or more rules for controlling output of content. Although data structure 300 may take the form of a table in a relational database in the example of FIG. 3, any other data structure may be used in other embodiments. Data structure 300 may take the form of a table storing various types of information associated with particular content. Data structure 300 may be included as a portion of or all of rules data structure 214 of FIG. 2 and may be stored on or otherwise accessible by electronic device 100 (e.g., stored in memory 104 or accessible from another device or server via communications circuitry 106).

Entries may be added to or removed from data structure 300 using I/O interface 111 of device 100 or an administrative interface (not shown). For example, as shown in FIG. 3, data structure 300 may include rule column 302, content column 304, condition column 306, action column 308, and priority column 310.

Each row of column 302 may include a unique value that may distinguish one rule from another within data structure 300. Each row of content column 304 may include an identifier that may identify particular content that may be controlled by the rule of that row. For example, each particular content identified by each row of content column 304 may include a particular application, work file, video file, audio file, or any other type of content, and may be identified in any suitable manner (e.g., by filename, location, size, etc.). Alternatively, the particular content may include a particular type of content (e.g., a particular file format, a particular type of movie (e.g., rated R, rated PG, etc.), all movies, etc.), and all content of that particular type may be controlled by the particular rule.

Condition column 306 may include one or more conditions that may be related to human detection. For example, a condition may include a description of what may be found in a determined human profile (e.g., in current detected human profile data 209) to satisfy a particular (e.g., one or more detected individuals (e.g., one or more of a child, an elderly person, a specific individual, any unauthorized individual, etc.)). In some embodiments, an unauthorized individual may include a known user who may have been set as unauthorized. In other embodiments, an unauthorized user may include any individual that content control system 204 may not recognize. Condition column 306 may also include any other suitable condition (e.g., a particular current content status that may be indicated by current content status information 215, a particular position of device 100, a particular time of day, or any other information accessible by device 100).

Because output of content may be controlled differently depending on which conditions of certain rules defined for that content are satisfied, a rule that may be defined for particular content (or content of a particular type) may include one or more sets of conditions, where each set of conditions may correspond to one or more corresponding actions. Action column 308 may include one or more actions that may be performed when one or more corresponding conditions or sets of conditions is satisfied. An action may include, for example, any suitable action to control output of corresponding content (e.g., pausing, stopping, closing, hiding, locking, playing, muting, adjusting, deleting, granting access, restricting access, etc.). An action may, for example, correspond to specific machine-readable commands for effecting a desired result.

Priority column 310 may include a numerical identifier or other value that may indicate a level of importance of a corresponding rule (or of a condition or a set of conditions that may be associated with the corresponding rule) with respect to another rule (or to a condition or a set of conditions that may be associated with such another rule) that may be defined for the same content.

In some embodiments, content control system 204 may alter a presentation of content in response to at least one child being detected during the presentation. For example, rule 320 may be defined for particular adult-rated material content 321 (e.g., one or more of an adult-rated movie, an adult-rated video, adult-rated music, adult-rated photos, etc.). Conditions 322a may be associated with rule 320 and may include at least one child being detected during a presentation of particular content 321. Action 322b may be associated with rule 320, may correspond to conditions 322a, and may include altering the presentation of the particular adult-rated material content 321 (e.g., content 321 may be paused, stopped, and/or hidden, a display (e.g., display 112) of device 100 may be turned off, a volume setting of the presentation may be lowered or muted, and/or sub-titles associated with content 321 may be enacted) when conditions 322a are satisfied.

In some embodiments, content control system 204 may control access to content in response to receiving a request to access the content, at least one adult being detected, and no children being detected. For example, conditions 324a may also be associated with rule 320, and may include receiving a request to access the particular adult-rated material content 321, at least one adult being detected, and no children being detected. Action 324b may be associated with rule 320, may correspond to conditions 324a, and may include granting access to the particular adult-rated material content 321 when conditions 324a are satisfied. For example, content control system 204 may grant access to the particular adult-rated content 321 by instructing content status module 216 with content control instruction 217 to play back content 321. That way, an adult may rest assured that no children are around while inappropriate material is being presented or otherwise accessed.

In some embodiments, content control system 204 may alter a presentation of content in response to a required individual not being detected during the presentation. For example, rule 330 may be defined for a particular application content 331 (e.g., one or more of a media player application, a word processing application, a file viewing application, etc.). Conditions 332a may be associated with rule 330 and may include a required individual not being detected during a presentation of the particular application content 331. Action 332b may be associated with rule 330, may correspond to conditions 332a, and may include altering the presentation of the particular application content 331 (e.g., the application may be closed, locked, and/or hidden, and/or a display (e.g., display 112) of device 100 may be turned off) when conditions 332a are satisfied.

In some embodiments, content control system 204 may control access to content in response to receiving a request to access the content and no unauthorized individuals being detected. For example, conditions 334a may also be associated with rule 330, and may include receiving a request to access particular application content 331 (e.g., one or more of a media player application, a word processing application, a file viewing application, etc.) and no unauthorized individuals being detected. Action 334b may be associated with rule 330, may correspond to conditions 334a, and may include granting access to the particular application content 331 when conditions 334a are satisfied. For example, content control system 204 may grant access to particular application content 331 by instructing content status module 216 with content control instruction 217 to allow particular application content 331 to be accessible and/or to present the particular application content 331.

In some embodiments, content control system 204 may alter a presentation of content in response to an unauthorized individual being detected during the presentation. For example, rule 340 may be defined for particular sensitive data content 331 (e.g., one or more of an e-mail, a document, a folder, and a file). Conditions 342a may be associated with rule 340 and may include an unauthorized individual being detected during a presentation of the particular sensitive data content 331. Action 342b may be associated with rule 340, may correspond to conditions 342a, and may include altering the presentation of the particular sensitive data content 331 (e.g., the sensitive data may be closed, locked, and/or hidden, and/or a display (e.g., display 112) of device 100 may be turned off) when conditions 342a are satisfied. An unauthorized individual may include, for example, any individual that content control system 204 may not recognize (e.g., no face data associated with that individual is accessible by device 100) or a specific individual that has been previously set as an individual who may not view or access the content associated with the rule. In some embodiments, content control system 204 may be configured to determine whether particular content (e.g., an e-mail) is sensitive or not by analyzing the content for any words, phrases, images, and the like. For example, if an e-mail contains data indicating confidentiality, content control system 204 may determine that the e-mail is sensitive. Therefore, content control system 204 may automatically associate certain content as content defined by content 341. In other embodiments, a user may simply set a level of sensitivity for particular content (e.g., in data structure 300 or in any other data structure). Therefore, content control system 204 may be configured to allow a user to associated certain content as content covered by content 341.

In some embodiments, content control system 204 may control access to content in response to receiving a request to access the content and only a specific individual being detected. For example, conditions 344a may also be associated with rule 340, and may include receiving a request to access the particular sensitive data content 341 and only a specific individual being detected. Action 344b may be associated with rule 340, may correspond to conditions 344a, and may include granting access to the particular sensitive data content 341 when conditions 344a are satisfied. For example, content control system 204 may grant access to the particular sensitive data content 341 by instructing content status module 216 with content control instruction 217 to allow the particular sensitive data content 341 to be accessible and/or to present the particular sensitive data content 341. The particular individual in this instance may have been previously set as a required individual for the sensitive data who must be present without anyone else also being present prior to access being granted.

In some embodiments, a rule and an associated action may be defined for particular content not only based on current content status (e.g., that access to the particular content is currently being requested or that the particular content is currently being presented) and one or more human detection related conditions (e.g., a child being detected), but also based on any other suitable condition or sets of conditions (e.g., a particular location of device 100, a particular time, environmental conditions, etc.). For example, an authorized user of device 100 may be comfortable with unauthorized users being detected by device 100 while the authorized user is using device 100 to access content while at the authorized user's home or office, but may be uncomfortable if this occurs while the authorized user is using device 100 outside of the authorized user's home or office (e.g., during a subway or bus ride, on the street, etc.). Thus, in some embodiments, content control system 204 may alter the presentation of content in response to, during the presentation, an unauthorized individual being detected while device 100 is positioned at a particular location X (or not at a particular location X). For example, rule 350 may be defined for particular sensitive data content 351. Conditions 352a may be associated with rule 350 and may include, during a presentation of the particular sensitive data content 351, an unauthorized individual being detected while device 100 is positioned at a particular location X (e.g., at an individual's home). Action 352b may be associated with rule 350, may correspond to conditions 352a, and may include continuing the presentation of the particular sensitive data content 351 or simply displaying a pop-up notification to the user that someone may be present (e.g., because any unauthorized individual detected by device 100 while located at a trusted location X may be known to the individual using device 100, and thus, there may not be a need to close or hide the particular sensitive data).

In some embodiments, content control system 204 may alter a presentation of content in response to, during the presentation, an unauthorized individual being detected while device 100 is not positioned at a particular location X (e.g., away from an individual's home). For example, conditions 354a may also be associated with rule 350, and may include, during a presentation of the particular sensitive data content 351, an unauthorized individual being detected while device 100 is not positioned at a particular location X. Action 354b may correspond to conditions 354a, and may include altering the presentation of the particular sensitive data content 351 (e.g., the sensitive data may be closed, locked, and/or hidden, and/or a display (e.g., display 112) of device 100 may be turned off) when conditions 354b are satisfied. For example, because an individual using device 100 may not be in a known location X, any unauthorized individual detected by device 100 may need to be prevented from accessing or viewing particular sensitive data content 351 (e.g., a stranger on a subway who may be stealing glances at the user's device 100).

In some embodiments, content control system 204 may alter a presentation of content in response to at least one elderly individual being detected during the presentation. For example, rule 360 may be defined for particular multi-media content 361 (e.g., a TV show or program, a movie, a video, music, photos, etc.). Conditions 362a may be associated with rule 360 and may include at least one elderly individual being detected during a presentation of the particular multi-media content 361. Action 362b may be associated with rule 360, may correspond to conditions 362a, and may include altering the presentation of particular multi-media content 361 (e.g., one or more presentation settings of the particular multi-media content may be adjusted) when conditions 362 are satisfied. For example, display size of particular multi-media content 361 may be increased and/or a volume setting may be increased. In some embodiments, if an elderly individual is no longer detected during the presentation of particular multi-media content 361, content control system 204 may revert the playback setting(s) to those that have been previously set prior to applying action 362b. For example, the display size of a particular multi-media content 361 may be reverted and/or a volume setting may be reverted.

In some embodiments, content control system 204 may alter a presentation of content in response to, during the presentation, at least one elderly individual being detected, where one of the at least one detected elderly individuals is a particular individual. For example, conditions 364a may also be associated with rule 360, and may include, during a presentation of the particular multi-media content 361, at least one elderly individual being detected, where one of the at least one detected elderly individuals is a particular individual. Action 364b may correspond to conditions 364a, and may include altering the presentation of the particular multi-media content 361 (e.g., only certain settings of the particular multi-media presentation may be adjusted) when conditions 364a are satisfied. For example, the particular elderly individual may be associated with hearing loss, but not vision loss, and thus, only audio settings may need to be adjusted when that particular elderly individual is present. In some embodiments, if an elderly individual is no longer detected during the presentation of multi-media content 361, content control system 204 may revert the playback setting(s) to those that have been previously set prior to applying action 364b.

In some embodiments, content control system 204 may alter a presentation of content in response to an individual that is associated with a particular language being detected during the presentation. For example, conditions 366a may also be associated with rule 360, and may include an individual that is associated with a particular language being detected during a presentation of the particular multi-media content 361. Action 366b may correspond to conditions 366a, and may include altering the presentation of the particular multi-media content 361 (e.g., captions for that particular language may be turned on for content 361, or the presentation of the particular multi-media content 361 may be stopped, and a version of the particular multi-media content in that particular language may be played back) when conditions 366a are satisfied. This may be achieved, for example, by comparing known languages for each known individual (e.g., stored in detection data structure 210) with known language versions of the particular multi-media content 361. For example, content control system 204 may determine that the particular multi-media is related to a particular language by referring to metadata or any other data associated with the particular multi-media content 361 (e.g., data stored on device 100 or any other external device accessible to device 100). In some embodiments, a current position (e.g., time) of the particular multi-media content being presented may be recorded and the particular language version of the particular multi-media content may be played back starting at a corresponding position. In other embodiments, the particular language version of the particular multi-media content 361 may be played back from the beginning or at any other suitable position. It should be appreciated that the particular multi-media content 361 may, alternatively or additionally, include a document, a web-site, or any other human readable content. For example, if an individual associated with the Spanish language is detected, then the particular multi-media content 361 may be automatically translated into Spanish.

In some embodiments, content control system 204 may control access to content in response to receiving a request to access the content, a specific individual being detected, and playback of the content was most recently altered by the specific individual. For example, conditions 368a may also be associated with rule 360, and may include receiving a request to access the particular multi-media content 361, a specific individual being detected, and playback of the particular multi-media content 361 was most recently altered by the specific individual. Action 368b may be associated with rule 360, may correspond to conditions 368a, and may include granting access to the particular multi-media content 361 when conditions 368a are satisfied. For example, content control system 204 may grant access to the particular multi-media content 361 by instructing content status module 216 with content control instruction 217 to allow the particular multi-media content 361 to be resumeable and/or to resume playback of the particular multi-media content 361. Thus, particular individual A may rest assured that, after individual A pauses or stops content 361, no other individual will interfere with the particular multi-media content 361 when that particular individual A is not present.

In some embodiments, content control system 204 may control access to content in response to receiving a request to access the content, a first specific individual being detected, and a second specific individual being detected. For example, conditions 369a may also be associated with rule 360, and may include receiving a request to access the particular multi-media content 361, specific individual "A" being detected, and specific individual "B" being detected. Action 369b may be associated with rule 360, may correspond to conditions 369a, and may include granting access to the particular multi-media content 361 when conditions 369a are satisfied. For example, content control system 204 may grant access to the particular multi-media content by instructing content status module 216 with content control instruction 217 to allow the particular multi-media content to be accessible and/or to present the particular multi-media content. Thus, for example, a first particular individual A may rest assured that a second particular individual B will not be able to enjoy particular multi-media content when the first particular individual A is not present.

In some embodiments, content control system 204 may alter a presentation of content in response to at least one individual being detected within a threshold distance from device 100 or from a component of device 100 during the presentation. For example, rule 370 may be defined for particular content 371 (e.g., a web browser, a word processing application, a media player application, etc.) that may utilize a display of an on-screen keyboard (e.g., of a virtual keyboard on a touch screen of I/O interface 111). Conditions 372a may be associated with rule 370 and may include at least one individual being detected within a threshold distance from device 100 or a component of device 100 during a presentation of particular content 371. Action 372b may be associated with rule 370, may correspond to conditions 372a, and may include altering the presentation of the particular content (e.g., the on-screen keyboard may be turned on, activated, or displayed) when conditions 372a are satisfied. The threshold distance may be a default value set by a manufacturer of device 100 or it may be an adjustable value that a user of device 100 may set (e.g., via an administrative panel or screen of device 100 (not shown)). In some embodiments, if there are no longer any individuals being detected within the threshold distance during the presentation of the particular content 371, e.g., if each detected individual is detected to be beyond the threshold distance (if any individuals are detected)), then content control system 204 may instruct display 112 to stop displaying the on-screen keyboard (e.g., turn the on-screen keyboard off). This may be useful, when a user is too far away from device 100 to use an on-screen keyboard, to remove the on-screen keyboard to save display real estate.

In some embodiments, content control system 204 may alter a presentation of content in response to at least one disabled individual (e.g., based on information for that individual that may be stored in memory 104) being detected during the presentation. For example, a particular rule (not shown) may be defined for particular multi-media content 361 (e.g., a TV show or program, a movie, a video, music, photos, etc.). Particular conditions may be associated with the particular rule and may include at least one disabled individual being detected during a presentation of the particular multi-media content 361. One or more actions may be associated with the particular rule, may correspond to the particular conditions, and may include altering the presentation of particular multi-media content 361 (e.g., captions may be turned on for content 361) when the particular conditions are satisfied. In some embodiments, if the disabled individual is no longer detected during the presentation of particular multi-media content 361, content control system 204 may revert the alteration. For example, the captions for particular multi-media content 361 may be turned off.

In some embodiments, content control system 204 may alter a presentation of content in response to a particular wireless device ID being detected during the presentation (e.g., communications circuitry 106 and/or detector 114 may include Bluetooth™ capability for detecting one or more Bluetooth™ capable devices within an environment of device 100, and content control system 204 may be coupled to such communications circuitry 106 and/or such detector 114 and may determine that a particular Bluetooth™ capable device or a known Bluetooth™ device that may be associated with a particular individual or class of individuals (e.g., based on data stored in memory 104) may be present in the environment at device 100). For example, a particular rule (not shown) may be defined for particular adult-rated material content 321 (e.g., one or more of an adult-rated movie, an adult-rated video, adult-rated music, adult-rated photos, etc.). Particular conditions may be associated with the particular rule and may include a particular device ID being detected during a presentation of the particular adult-rated material content 321. One or more actions may be associated with the particular rule, may correspond to the particular conditions, and may include altering the presentation of particular multi-media content 321 (e.g., content 321 may be paused, stopped, and/or hidden, a display (e.g., display 112) of device 100 may be turned off, a volume setting of the presentation may be lowered or muted, and/or sub-titles associated with content 321 may be enacted) when the particular conditions are satisfied (e.g., when a particular wireless device associated with a particular individual is identified).

It should be appreciated that the rules described above with respect to data structure 300 are only some of the many possibilities of rules that may be set for particular content, and that any suitable rule may be created, modified, and/or deleted for the purpose of controlling output of content based on human detection related conditions. For example, although only rule 350 may be described above as being associated with a particular location of device 100, a particular time, or any other particular environmental condition(s), any of rules 320, 330, 340, 360, 370, and any other suitable rule that may be created and stored in rules data structure 214 may also be associated with one of more of a particular location of device 100, a particular time, or any other particular environmental condition(s).

It should further be appreciated that, although data structure 300 may include rules that may include granting access as the action when a corresponding condition or set of conditions is satisfied, any of the rules (and any other suitable rule) may instead include restricting access as the action. That is, data structure 300 may also include rules for restricting (rather than granting) access to particular content.

In some embodiments, a condition or set of conditions for each of two or more rules may be simultaneously satisfied. In these instances, each corresponding action that may be associated with the satisfied condition or set of conditions may be performed according to a predefined priority. For example, if conditions 322a of rule 320 and conditions 362a of rule 360 are simultaneously satisfied, content control system 204 may refer to priority values that may be associated with conditions 322a and conditions 362a, respectively, to determine which action(s) should be performed. For example, as shown in FIG. 3, a priority of '1' that may be associated with conditions 322a of rule 320 may denote a higher priority than a priority of '2' that may be associated with conditions 362a of rule 360, and, thus, action 322b may be performed, and action 362b may not be performed or may be performed subsequent to performing action 322b (e.g., if action 362b conflicts with action 322b).

Data structure 300 may store one or more rules and corresponding conditions and actions for controlling the output of particular content based on one or more human detection related conditions (e.g., a specific individual or an individual belonging to a general "class" of individuals being detected or not being detected). Although specific "classes" of individuals may have been described above with respect to certain rules of data structure 300 (e.g., elderly, child, associated with a particular language, etc.), it should be appreciated that any suitable "classes" of individuals may be defined and included in one or more rules of data structure 300. For example, a class of individuals can include males, females, elderly individuals, adults, children, individuals associated with a particular language, individuals of a particular height, individuals of a particular weight, individuals having a particular disability (e.g., blind individuals, individuals that are hard of hearing, etc.), any other suitable class, and any combination thereof. Additionally, or alternatively, a class of individuals can be based on one or more relationships (e.g., family, friend, co-worker, etc.) between individuals of that class and one or more authorized users of device 100. In some embodiments, manager module 206 may be capable of monitoring activities of a particular authorized user and/or analyzing information associated with the particular authorized user (e.g., the particular authorized user's address book contacts that may be stored in memory 104, the particular authorized user's social networking friends and/or activities that may be detected from current content status information 215 while a social networking application and/or web site is currently being presented by content status module 216, instant messaging conversations, web surfing history, etc.) to determine one or more individuals that may belong to a particular class of individuals with respect to that particular authorized user. For example, manager module 206 may identify that individual X from the particular authorized user's address book is a family member (e.g., mother) of the particular authorized user, and may associate individual X with a "family" class. As another example, manager module 206 may determine (e.g., based on one or more online chat sessions, between the particular authorized user and individual Y, that may be detected from current content status information 215 while a chat application and/or web site is currently being presented by content status module 216) that individual Y may be a friend of the particular authorized user, and may associate individual Y with a "friend" class. As yet another example, manager module 206 may determine that an individual Z is currently present (e.g., based on captured human recognition data 203 provided by detector 114 and corresponding detected human profile data 209 provided by detection module 208) when a particular authorized user is currently opening or unhiding sensitive data content (e.g., as detected from current content status information 215), and thus manager module 206 may learn that individual Z may be a trusted associate of the particular authorized user, and may associate individual Z with a "trusted" class (e.g., for that sensitive data content).

FIG. 4 is a flowchart of an illustrative process 400 that may control output of content based on human recognition data detection. Process 400 may begin at step 402. At step 404, process 400 may attempt to detect human recognition data of one or more individuals. For example, content control system 204 may instruct detector 114 with detector control instructions 201 to capture human recognition data 203 in a particular way, and detector 114 may send current captured face 203 to detection module 208 for analysis.

At step 406, process 400 may determine whether the detected data satisfies at least one condition of at least one rule that is defined for particular content.

In some embodiments, prior to step 406, manager module 206 of content control system 204 may receive current content status information 215 from content status module 216 that may indicate a user request to access particular content. In response, manager module 206 may access rules data structure 214 to retrieve content rules data 211 that may include one or more rules that may be defined for the particular content. Manager module 206 may send human detection request 205 to detection module 208 to instruct detection module 208 to analyze current captured data 203 in any suitable manner. For example, face detection request 205 may include one or more instructions that may command detection module 208 to analyze current captured data 203 and to generate detected human profile data 209 based on the analysis. Detection module 208 may access detection data structure 210 to retrieve any suitable human detection data 207 as part of the analysis, and may send detected human profile data 209 to manager module 206. Manager module 206 may then determine whether detected human profile data 209 satisfies the respective condition(s) of one or more of the rules included in content rules data 211. As another example, a condition for a particular rule included in content rules data 211 may require that only a specific individual be detected (e.g., condition 344a of rule 340 of data structure 300). In this instance, face detection request 205 may include one or more instructions that may command detection module 208 to specifically detect whether current captured human recognition data 203 includes only the specific individual (e.g., Tom). Thus, detection module 208 may access detection data structure 210, may retrieve human detection data 207 that only pertains to detecting whether only the specific individual is included in current captured human data 203, and may analyze current captured data 203 based on the received human detection data 207. In some embodiments, detection module 208 may, based on the analysis, generate detected human profile data 209 that indicates a complete profile of detected human data (e.g., that two adults and one child are detected, where the first adult is John, where the second adult is Mary and is an elderly person, and where the one child is Ian situated beyond a threshold distance from device 100). In other embodiments, detection module 208 may send detected human profile data 209 that may only indicate whether current captured human data 203 includes only the specific individual (e.g., yes or no). This way, the detection/recognition process may be more efficient, and processing by each of detection module 208 and manager module 206 may be reduced.

In other embodiments, prior to step 406, manager module 206 of content control system 204 may receive current content status information 215 from content status module 216 that may indicate that particular content is currently being presented by content status module 216. In response, manager module 206 may access rules data structure 214 to retrieve content rules data 211 that may include one or more rules that may be defined for the particular content currently being presented, and the human detection/recognition process similar to that described above may be performed.

If at step 406, process 400 determines that no condition of any rule that is defined for the particular content is satisfied, then process 400 may proceed to step 410 and the process may end. In some embodiments, the ending of process 400 may include restricting access to the particular content (e.g., if access to the particular content is requested). In other embodiments, the ending of process 400 may include not performing any further action (e.g., if the particular content is currently being presented, and no conditions of any rules defined for the particular content are satisfied).

If at step 406, process 400 instead determines that at least one condition of at least one rule that is defined for the particular content is satisfied, then process 400 may proceed to step 408. At step 408, process 400 may perform at least one action of at least one satisfied condition of at least one rule to control the output of the particular content. For example, if manager module 206 determines, at step 406, that at least one condition of at least one rule of the particular content is satisfied, manager module 206 may perform at least one action of the at least one rule to control the output of the particular content. For example, if access to particular sensitive data is requested, and if only a specific individual is detected (e.g., conditions 344a of rule 340 are satisfied for particular sensitive content 341), manager module 206 may instruct content status module 216 with content control instruction 217 to grant access to the particular sensitive data. In some embodiments, manager module 206 may simply instruct content status module 216 to allow the particular sensitive data to be accessible. In other embodiments, manager module 206 may instruct content status module 216 to present the particular sensitive data (e.g., content status module 216 may control output component 112 with adjusted control information 219 to display the particular sensitive data). As another example, if particular adult-rated content is currently being played back by content status module 216, and if at least one child is detected (e.g., conditions 322a of rule 320 are satisfied for particular sensitive content 321), manager module 206 may instruct content status module 216 with content control instruction 217 to pause the playback of that content (e.g., content status module 216 may control output component 112 with adjusted control information 219 to pause the playback of that content).

In some embodiments, content control system 204 may continuously attempt to detect human recognition data and steps 404 to 408 described above may be continuously performed. In this manner, when one or more condition(s) of the at least one rule is no longer satisfied, any action(s) of the at least one rule that has been performed may be reverted. For example, in the example described above, if manager module 206 determines that conditions 322a are no longer satisfied (e.g., no children are detected), manager module 206 may instruct content status module 216 with content control instructions 217 to resume the playback of the particular adult-rated content 231 (e.g., content status module 216 may control output component 112 with adjusted control information 219 to resume the playback). In some embodiments, manager module 206 may not automatically instruct content status module 216 to resume the playback, and an authorized individual (e.g., an adult) may need to be detected or may need to manually resume the playback. It should be appreciated that a reversion of any alteration of the presentation of content may apply to any rule in rules data structure 214 (e.g., data structure 300) when the condition of that rule is no longer satisfied.

In some instances, content control system 204 may determine that a condition or a set of conditions of more than one rule of data structure 300 may be satisfied. For example, content control system 204 may determine from current content status information 215 that particular adult-rated multi-media is currently being played back, that detected human profile data 209 includes the presence of a child, and that the child is situated beyond a predetermined distance threshold from a component of device 100. As a result, content control system 204 may determine that both of rules 320 and 370 of data structure 300 may be applicable (i.e., conditions 322a and 372a may be satisfied). To resolve any potential conflicts, content control system 204 may refer to priorities of priority column 310 that may be associated with each rule (or conditions 322a and condition 372a) to decide whether none, some, or all corresponding actions of action column 308 should be implemented. For example, content control system 204 may determine that the priority that may be associated with rule 320 (or conditions 322a) is '1' (e.g., a higher priority) and that the priority that may be associated with rule 370 (or condition 372a) is '3' (e.g., a lower priority), and may instruct content status module 216 (e.g., that may be functioning as a media player application) with content control instruction 217 to alter the playback of the particular adult-rated multi-media content 321/371 (e.g., pause, stop, and/or hide the adult-rated multi-media playback), and content status module 216 may adjust output component 112 (e.g., audio speaker and/or display of output component 112) with adjusted control information 219. Because the priority that may be associated with conditions 372a of rule 370 may be lower, content control system 204 may not perform action 372b that may be associated with conditions 372a of rule 370 (e.g., content control system 204 may not instruct content status module 216 with content control instruction 217 to display the on-screen keyboard). The priority of each rule may be set by an administrative user beforehand and may reflect the administrative user's desire to perform none, some, or all of the corresponding actions 308 of each rule. For example, in the example described above, an administrative user may desire that the device automatically alter playback of an adult-rated movie when a child is detected because it may be more important that the child not be exposed to inappropriate material, but ignore any other condition that the detected child may also satisfy (e.g., being beyond a threshold distance from device 100 or a component of device 100) because these other conditions may not be as important.

In some embodiments, an action pertaining to a lower priority condition, set of conditions, or rule may also be performed in addition to an action pertaining to one with a higher priority rule. For example, content control system 204 may determine that detected human profile data 209 includes the presence of an elderly person that is associated with a particular language, and thus both of conditions 362a and 366a of rule 360 of data structure 300 may be satisfied. Content control system 204 may determine that even though the priority associated with conditions 362a is '2' (e.g., a higher priority) and the priority associated with conditions 366a is '3' (e.g., a lower priority), that neither of corresponding actions 362b and 366b conflict with one another. Thus, content control system 204 may control output of the particular multi-media content 361 by performing both of corresponding actions 362b and 366b. For example, content control system 204 may instruct content status module 216 (e.g., that may be functioning as a media player application) with content control instruction 217 to alter a presentation of particular multi-media content 361 that may currently be presented (e.g., to increase a volume setting of playback of the particular multi-media content 361), and content status module 216 may adjust output component 112 (e.g., one or more speakers) with adjusted control information 219. In addition, content control system 204 may also instruct content status module 216 with content control instruction 217 to alter the presentation in another manner (e.g., to transition to playback the same multi-media content 361, but in a different language format (e.g., in a Spanish dubbed version of the multi-media content 361)).

In some embodiments, both of these corresponding actions 362b and 366b may be implemented simultaneously. In other embodiments, one action may be implemented after another action, according to any suitable criteria (e.g., based on priority column 310). For example, content control system 204 may determine that detected human profile data 209 includes the presence of an elderly person (e.g., conditions 362a of rule 360 of data structure 300) being situated farther than a predetermined threshold distance from a component of device 100 (e.g., conditions 370a of rule 370 of data structure 300), and may instruct content status module 216 with content control instruction 217 to increase the volume first (e.g., action 362b of rule 360), prior to instructing content status module 216 to display the on-screen keyboard (e.g., of a virtual keyboard on a touch screen of I/O interface 111) (e.g., action 372b of rule 370).

It should be appreciated that any suitable approach may be used for determining whether none, some, or all of the corresponding actions of multiple applicable rules should be performed based on their respective priority, and that the examples described above are for illustrative purposes only and are not intended to be limiting.

It should also be appreciated that, although only some rules of data structure 300 have been described above with regard to process 400, any of the rules of data structure 300 (and any other suitable rule) may also applied by process 400 depending on whether detected human data satisfies respective condition(s) of the rule.

Figure 5:
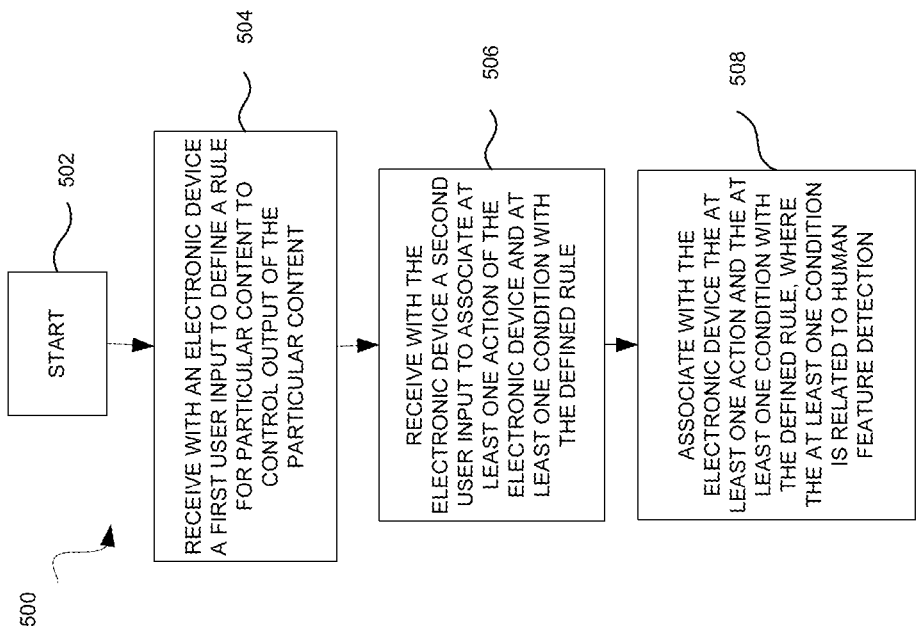
FIG. 5 is a flowchart of an illustrative process for setting rules in a data structure for controlling output of content, in accordance with some embodiments of the invention.

FIG. 5 is a flowchart of an illustrative process 500 that may set rules in a data structure for controlling output of content based on human recognition data detection. Process 500 may begin at step 502. At step 504, process 500 may receive a first user input to define a rule for particular content. For example, an administrative screen or panel (not shown) may be presented to a user on display 112, and may prompt the user to select particular content. Input component 110 may send the user selection in the form of user interaction data 213 to content status module 216, which may in turn relay the user selection in the form of current content status information 215 to manager module 206. Manager module 206 may then define a rule for the particular content. At step 506, process 500 may receive a second user input to associate at least one action of device 100 and at least one condition with the defined rule. For example, input component 110 may send the at least one action and the at least one condition in the form of user interaction data 213 to content status module 216, which may in turn relay this information in the form of current content status information 215 to manager module 206. At step 508, process 500 may associate the at least one action and the at least one condition with the defined rule. For example, manager module 206 may associate the at least one action and the at least one condition with the defined rule and direct content rule data structure 214 to store the defined rule. As an example, manager module 206 may associate the condition 'at least one child is detected' and the action 'pause the adult-rated content' with rule 320 of data structure 300 for particular adult-rated content 321).

It should be appreciated that the user may input selections of the particular content, the at least one action, and the at least one condition by, for example, typing, selecting, or otherwise designating using the administrative screen or panel, or any other suitable interface.

Figure 6:
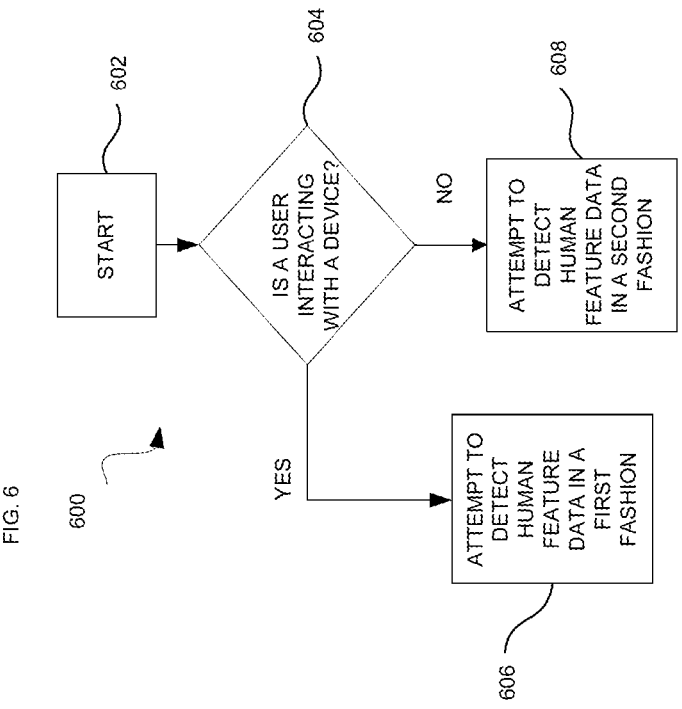
FIG. 6 is a flowchart of an illustrative process for adjusting a fashion of data capture by one or more sensors of an electronic device, in accordance with some embodiments of the invention.

FIG. 6 is a flowchart of an illustrative process 600 that may adjust a rate of human feature detection/recognition. Because human feature detection/recognition processes may involve various components, such as control circuitry 102 and detector 114, human feature detection may be resource intensive. Thus, when a user is interacting with a device (e.g., when a user is typing on a keyboard input component 110 of device 100), there may not be a need to perform the various human feature detection/recognition processes too frequently because the user is likely present at the device. For example, content control system 204 may be configured to adjust the frequency or rate of data capture for attempting to detect human feature data by controlling the rate of capture of image data, infrared data, and/or any other data by detector 114, as described above. Process 600 may begin at step 602. At step 604, process 600 may determine whether a user is interacting with the device. For example, the user may input to device 100 using input component 110, which may include a keyboard, a mouse, a touchscreen, or any other suitable input device, and user interaction data 213 may be received by content status module 216 from input component 110. If process 600 determines that the user is interacting with the device, process 600 may proceed to step 606, where process 600 may attempt to detect human feature data at a first rate. For example, manager module 206 may determine, from current content status 215 received from content status module 216, that the user is interacting with device 100, and may, as a result, send detector control instructions 201 to detector 114 to instruct detector 114 to attempt to detect human feature data in a first fashion (e.g., at a first rate). As an example, the first fashion may be a first rate set at 60 seconds, where data capture by detector 114 may be controlled to occur once every 60 seconds.

At step 604, if process 600 instead determines that the user is not interacting with the device (e.g., the user is not providing an input), process 600 may proceed to step 608, where process 600 may attempt to detect human feature data in a second fashion. For example, manager module 206 may determine, from current content status 215 received from content status module 216, that the user is not interacting with device 100, and may, as a result, send detector control instructions 201 to detector 114 instruct detector 114 to attempt to detect human feature data in a second fashion. The second fashion may be at a second rate that may be set at a lower rate than the first rate because it may be likely that the user is not currently present at the device, but may return at any moment. For example, the second rate may be set at 30 seconds, where data capture by detector 114 may be controlled to occur once every 30 seconds.

In some embodiments, the first fashion and the second fashion may include manners of using one or more sensors of detector 114. For example, the first fashion may include operating sensors of detector 114 in a particular order or sequence, and the second fashion may include operating these sensors in a different order of sequence.

For example, detector 114 may be initially set at a default fashion to periodically capture data, where content control system 204 may send detector control instructions 201 to detector 114 (e.g., from control circuitry 102, through bus 103, and to detector 114) to control the fashion of data capture. In some embodiments, detector 114 may include an internal processing unit (not shown) and content control system 204 may send a single command including a fashion instruction to detector 114. The processing unit of detector 114 may then set its fashion of data capture to the set fashion of the fashion instruction. In other embodiments, content control system 204 may send a series of continual commands at a determined rate, where each command of the series of commands may control detector 114 to perform a capture of data at a single instant. In this case, there may not be a need for detector 114 to store the received rate.

In some embodiments, a user interaction with device 100 may not always require the user to provide input using input component 110. For example, a user may interact with device 100 by passively viewing a movie file being played back. Thus, content control system 204 may be capable of setting the first fashion differently based on a type of content being presented. A first fashion (e.g., a first rate of 60 seconds) that may be set for one type of content that may be presented may not be suitable for another type of content being presented. In particular, content control system 204 may determine that content is currently being presented or may receive notification of such an event (e.g., via current content status data 215), and may use this information as part of its control of the fashion of data capture by detector 114. For example, if content control system 204 determines that content status module 216 is currently running a particular application (e.g., a word processing application) that may require usage of a particular input component 110 (e.g., a keyboard, mouse, microphone, etc.), content control system 204 may set the first fashion differently (e.g., at a slower rate) than if content control system 204 determines that content status module 216 is currently running a different type of application (e.g., a media player that is playing a movie file) that may not require any usage of an input component 110.

In some embodiments, content control system 204 may also determine whether any content to which access is being requested and/or being presented may contain potentially confidential information. If so, content control system 204 may determine a sensitivity level of the content and may set the first fashion based on the determined sensitivity. For example, an administrative user may have set a higher priority for an action of a rule defined for highly sensitive content in data structure 300, and content control system 204 may refer to this priority to set the first fashion. In some embodiments, an administrative user may set a specific privacy level for particular content (e.g., an application, file, etc.), which may be stored in a data structure (not shown), and which may be accessible by content control system 204. In other embodiments, content control system 204 may utilize any suitable technique to analyze the content to determine its sensitivity level (e.g., running optical character recognition on a word processing document to identify words indicating its sensitivity).

In some embodiments, manager 206 may also be operative to control which sensor or sensors of detector 114 to use for detection and a fashion of the detection (e.g., via detector control instructions 201), based on any suitable condition (e.g., current content status 215, a current location of device 100, a current time, etc.). As described above with respect to rule 350 (e.g., conditions 352a and 354a), for example, if detector 114 determines that device 100 is located (e.g., the positioning circuitry may output location information directly to manager module 206, or to detection module 208, which may subsequently notify manager module 206 of the location information via a location instruction) at a particular predefined location (e.g., at a home of an authorized user of device 100), content control system 204 may not attempt to hide or close particular sensitive data that may be presented, but may instead allow the presentation to continue. In some embodiments, when device 100 is determined to be located at the particular predefined location, manager 206 may control detector 114 to use only a limited number of sensors (e.g., only a motion sensor until motion indicates a new individual may be present) because the chances of an unauthorized user appearing and viewing potentially sensitive data may be smaller, and thus, device 100 may not need to be too alert. When device 100 is determined not to be located at the particular predefined location, for example, manager 206 may instead control detector 114 to use more sensors (e.g., a camera sensor) because the chances of an unauthorized user appearing and viewing potentially sensitive data may be higher, and thus, device 100 may need to be more alert.

FIG. 7 is a flowchart of an illustrative process 700 that may perform human feature detection/recognition. Human feature detection/recognition, as described above, may involve using at least one type of captured human feature data (e.g., image data captured by image sensor 116 or infrared data captured by infrared sensor 118). However, a combination of different sensor data from different sensors of detector 114 may also be captured and utilized to control output of content. That is, human feature detection may include capturing data using both image sensor 116 and infrared detector 118 simultaneously or in any desired order.

Process 700 may begin at step 702. At step 704, each one of at least two sensors of a detector (e.g., image sensor 116 and infrared sensor 118 of detector 114) may detect human feature data by capturing respective data. For example, content control system 204 may control each one of image sensor 116 and infrared sensor 118 of detector 114 to capture data in any particular order and based on any suitable criteria. At step 706, process 700 may determine whether the first data detected by the first sensor of the at least two sensors includes or matches stored first data of a human feature of an individual (or class of individuals) and whether the second data detected by the second sensor of the at least two sensors includes or matches stored second data of the human feature of the same individual (or class of individuals). For example, detection module 208 and detection data structure 210 may be employed to analyze the detected first data and the detected second data.

If process 700 determines, at step 706, that the detected first data includes or matches the stored first data and that the detected second data includes or matches the stored second data, the process may proceed to step 708, where process 700 may control output of content in a first manner. For example, content control system 204 may determine that a user request (e.g., based on user interaction data 213 received from input component 110) to access particular content is received prior to step 706. If content control system 204 determines that each one of detected image data from image sensor 116 and detected infrared data from infrared sensor 118 includes or matches respective stored data of a human feature of an authorized individual of the particular content, content control system 204 may control output of the particular content by granting access to the particular content (e.g., manager module 206 may output content control instruction 217 to content status module 216 to present the particular content). As another example, device 100 may be presenting the particular content (e.g., the particular content may be presented by content status module 216 on input/output interface 111) prior to step 706. If content control system 204 determines that each one of the detected image data and the detected infrared data includes or matches respective stored data of a face of an authorized individual of the particular content, content control system 204 may control output of the particular content by maintaining or continuing the presentation of the particular content (e.g., manager module 206 may output content control instruction 217 to content status module 216 to maintain or continue the presentation of the particular content).

If process 700 instead determines, at step 706, that at least one of the detected first data does not include or match the stored first data and the detected second data does not include or match the stored second data, process 700 may proceed to step 710, where process 700 may control output of content in a second manner. For example, content control system 204 may determine that a user request (e.g., based on user interaction data 213 received from input component 110) to access particular content is received prior to step 706. If, content control system 204 determines that at least one of the detected image data from image sensor 116 and the detected infrared data from infrared sensor 118 does not include or match respective stored data of a human feature of an authorized individual of the particular content, content control system 204 may control output of the particular content by restricting access to the particular content (e.g., manager module 206 may output content control instruction 217 to content status module 216 to prevent content status module 216 from presenting the particular content). As another example, content control system 204 may be presenting the particular content (e.g., the particular content may be presented by content status module 216 on input/output interface 111) prior to step 706. If content control system 204 determines that at least one of the detected image data and the detected infrared data does not include or match respective stored data of a human feature of an authorized individual of the particular content, content control system 204 may control output of the particular content by altering the presentation of the particular content (e.g., manager module 206 may output content control instruction 217 to content status module 216 to alter the presentation of the particular content, and content status module 216 may output adjusted control information 219 to adjust a setting of output component 112 accordingly).

In some embodiments, rather than performing human feature detection by capturing data detected using both a first sensor and a second sensor simultaneously, only one of the sensors may first be employed, while the other one of the sensors may be set to stand-by or turned off. For example, infrared sensor 118 may be initially set to stand-by or off, and image sensor 116 may be employed to detect human feature data. If the data detected by image sensor 116 includes or matches image data of a face of an individual, infrared sensor 118 may then be turned on to detect human feature data.

Alternatively, image sensor 116 may be initially set to stand-by or off, and infrared sensor 118 may be employed to generally detect an individual, where only if infrared sensor 118 detects appropriate human feature data (e.g., face data or an individual's heat signature data in general), may image sensor 116 be turned on to detect human feature data. This may result in power savings since image sensor 116, which may utilize more power than infrared sensor 118, may initially be inactive and may only be turned on after infrared sensor 118 detects appropriate human feature data.

It is to be understood that the steps shown in each one of processes 400-700 of FIGS. 4-7 are merely illustrative and that existing steps may be modified or omitted, additional steps may be added, and the order of certain steps may be altered.

Moreover, the processes described with respect to FIGS. 4-7, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol (e.g., the computer-readable medium may be communicated to electronic device 100 via communications circuitry 106). The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that each module of content control system 204 may be provided as a software construct, firmware construct, one or more hardware components, or a combination thereof. For example, content control system 204 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of content control system 204 are merely illustrative, and that the number, configuration, functionality, and interconnection of existing modules may be modified or omitted, additional modules may be added, and the interconnection of certain modules may be altered.

At least a portion of one or more of the modules of content control system 204 may be stored in or otherwise accessible to device 100 in any suitable manner (e.g., in memory 104 of device 100 or via communications circuitry 106 of device 100). Each module of content control system 204 may be implemented using any suitable technologies (e.g., as one or more integrated circuit devices), and different modules may or may not be identical in structure, capabilities, and operation. Any or all of the modules or other components of content control system 204 may be mounted on an expansion card, mounted directly on a system motherboard, or integrated into a system chipset component (e.g., into a "north bridge" chip). Content control system 204 may include any amount of dedicated graphics memory, may include no dedicated graphics memory and may rely on device memory 104 of device 100, or may use any combination thereof.

Content control system 204 may be a dedicated system implemented using one or more expansion cards adapted for various bus standards. For example, all of the modules may be mounted on different interconnected expansion cards or all of the modules may be mounted on one expansion card. The modules of content control system 204 may interface with a motherboard or processor 102 of device 100 through an expansion slot (e.g., a peripheral component interconnect ("PCI") slot or a PCI express slot). Alternatively, content control system 204 need not be removable but may include one or more dedicated modules that may include memory (e.g., RAM) dedicated to the utilization of the module. In other embodiments, content control system 204 may be a graphics system integrated into device 100. For example, a module of content control system 204 may utilize a portion of device memory 104 of device 100. One or more of the modules of content control system 204 may include its own processing circuitry and/or memory, and/or one or more of the modules of content control system 204 may share processing circuitry and/or memory with another one or more modules of content control system 204. Alternatively each module of content control system 204 may share processing circuitry and/or memory with any other module of content control system 204 and/or processor 102 and/or memory 104 of device 100.

Although some of the embodiments above may have been described with respect to captured face data, any type of suitable data (e.g., the height of one or more detected individuals, the movement of one or more detected individuals, the audible voice of one or more detected individuals, etc.) may, in addition, or alternatively, be captured to determine the human feature profile of one or more detected individuals.

While there have been described systems and methods for controlling output of content based on human recognition data captured by one or more sensors, it is to be understood that many changes may be made therein without departing from the spirit and scope of the invention. Those skilled in the art will appreciate that the invention can be practiced by other than the described embodiments, which are presented for purposes of illustration rather than of limitation, and the invention is limited only by the claims which follow.

What is claimed is:

1. A method of controlling output of content using an electronic device, wherein the content is associated with at least one rule that comprises at least one condition and at least one action, the method comprising:
   attempting with the electronic device to detect human feature data;
   in response to detecting the human feature data, determining with the electronic device whether the detected human feature data satisfies the at least one condition of the at least one rule; and
   in response to a determination that the detected human feature data satisfies the at least one condition, performing with the electronic device the at least one action to control the output of the content, wherein:
   the at least one condition comprises detecting no individual being positioned within a threshold distance from a touch screen interface component of the electronic device;
   the performing the at least one action comprises terminating the presentation of a virtual keyboard input component of the content on the touch screen interface component of the electronic device; and
   the performing the at least one action further comprises maintaining the presentation of another component of the content on the touch screen interface component of the electronic device during the terminating.

2. The method of claim 1, wherein the threshold distance is set by an end user of the electronic device.

3. The method of claim 1, wherein the other component of the content comprises one of a web browser, a word processing application, and a media player application.

4. The method of claim 1, wherein the attempting comprises attempting with the electronic device to detect human feature data while presenting the other component of the content on the touch screen interface component of the electronic device.

5. The method of claim 4, wherein the other component of the content comprises an application content component.

6. A method of controlling output of content using an electronic device, the method comprising:
   detecting with a first sensor of the electronic device first data of an environment of the electronic device;
   determining with the electronic device whether the detected first data comprises stored first data of a human feature of a particular individual human;
   in response to a determination that the detected first data comprises the stored first data:
      enabling a previously disabled second sensor of the electronic device;
      detecting with the second sensor of the electronic device second data of the environment of the electronic device;
      determining with the electronic device whether the detected second data comprises stored second data of the human feature of the particular individual human; and
      in response to a determination that the detected second data comprises the stored second data, controlling with the electronic device the output of the content in a first manner; and
   in response to a determination that the detected first data does not comprise the stored first data, controlling the output of the content in a second manner, wherein:
   the first sensor comprises one of an image sensor and an infrared sensor;
   the second sensor comprises the other one of the image sensor and the infrared sensor;
   the detected first data comprises one of image data and infrared data; and
   the detected second data comprises the other one of image data and infrared data.

7. The method of claim 6, wherein:
the particular individual human is authorized to access the content;
the method further comprises, prior to the determining with the electronic device whether the detected first data comprises the stored first data, receiving a user request to access the content; and when the detected first data is determined to comprise the stored first data and when the detected second data is determined to comprise the stored second data, the controlling the output of the content in the first manner comprises granting access to the content.

8. The method of claim 6, wherein:
the particular individual human is authorized to access the content;
the method further comprises, prior to the determining with the electronic device whether the detected first data comprises the stored first data, receiving a user request to access the content; and
when at least one of the detected first data is determined not to comprise the stored first data and the detected second data is determined not to comprise the stored second data, the controlling the output of the content in the second manner comprises restricting access to the content.

9. The method of claim 6, wherein:
the particular individual human is authorized to access the content;
the method further comprises, prior to the controlling, presenting with the electronic device the content; and
when the detected first data is determined to comprise the stored first data and when the detected second data is determined to comprise the stored second data, the controlling the output in the first manner comprises maintaining the presenting of the content.

10. The method of claim 6, wherein:
the particular individual human is authorized to access the content;
the method further comprises, prior to the controlling, presenting with the electronic device the content; and
when at least one of the detected first data is determined not to comprise the stored first data and the detected second data is determined not to comprise the stored second data, the controlling the output in the second manner comprises altering the presenting of the content.

11. The method of claim 6, wherein:
the first sensor comprises the image sensor;
the second sensor comprises the infrared sensor;
the detected first data comprises the image data; and
the detected second data comprises the infrared data.

12. The method of claim 6, wherein:
the first sensor comprises the infrared sensor;
the second sensor comprises the image sensor;
the detected first data comprises the infrared data; and
the detected second data comprises the image data.

13. The method of claim 6, wherein the detecting the first data is performed before the detecting the second data.

14. A method of controlling output of content on a touch screen interface component of an electronic device, wherein the content is associated with a first rule that comprises a first condition and a first action and with a second rule that comprises a second condition and a second action, and wherein the content comprises an application content component and a virtual keyboard input component, the method comprising:
while presenting the application content component on the touch screen interface component, attempting with the electronic device to detect human feature data;
in response to detecting the human feature data, determining with the electronic device whether the detected human feature data satisfies one of the first condition and the second condition;
in response to a determination that the detected human feature data satisfies the first condition, performing with the electronic device the first action to control the output of the content; and
in response to a determination that the detected human feature data satisfies the second condition, performing with the electronic device the second action to control the output of the content, wherein:
the first condition comprises detecting at least one individual being positioned within a threshold distance from the touch screen interface component;
the performing the first action comprises initiating a presentation of the virtual keyboard input component on the touch screen interface component;
the second condition comprises detecting no individual being positioned within the threshold distance from the touch screen interface component;
the performing the second action comprises terminating a presentation of the virtual keyboard input component on the touch screen interface component; and
the performing the second action further comprises maintaining the presentation of the application content component on the touch screen interface component.

15. The method of claim 14, wherein the threshold distance is set by an end user of the electronic device.

16. The method of claim 14, wherein the performing the first action further comprises maintaining the presentation of the application content component on the touch screen interface component.

17. The method of claim 14, wherein the application content component comprises one of a web browser, a word processing application, and a media player application.

18. The method of claim 14, wherein the detecting the at least one individual being positioned within the threshold distance does not comprise detecting the at least one individual touching the touch screen interface component.

* * * * *